(12) United States Patent
Kirksey et al.

(10) Patent No.: US 6,273,726 B1
(45) Date of Patent: *Aug. 14, 2001

(54) METHOD OF ASSOCIATING ORAL UTTERANCES MEANINGFULLY WITH WORD SYMBOLS SERIATIM IN AN AUDIO-VISUAL WORK AND APPARATUS FOR LINEAR AND INTERACTIVE APPLICATION

(75) Inventors: William E. Kirksey; Kyle S. Morris, both of New York, NY (US)

(73) Assignee: ReadSpeak, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,237

(22) Filed: May 12, 2000

Related U.S. Application Data

(60) Continuation of application No. 09/054,719, filed on Apr. 3, 1998, now Pat. No. 6,062,863, which is a division of application No. 08/310,458, filed on Sep. 22, 1994, now Pat. No. 5,741,136, which is a continuation-in-part of application No. 08/209,168, filed on Feb. 24, 1994, now abandoned, which is a continuation-in-part of application No. 08/126,341, filed on Sep. 24, 1993, now abandoned.

(51) Int. Cl.[7] .................................................. G09B 19/04
(52) U.S. Cl. .......................... 434/169; 434/167; 434/168
(58) Field of Search .................................... 434/156, 157, 434/167, 168, 169, 185, 118, 307 R, 308, 316, 365, 310, 311, 12

(56) References Cited

U.S. PATENT DOCUMENTS

| | | | |
|---|---|---|---|
| 5,741,136 | * 4/1998 | Kirksey et al. | 434/169 |
| 5,938,447 | * 8/1999 | Kirksey et al. | 434/185 |
| 6,062,863 | * 5/2000 | Kirksey et al. | 434/169 |

* cited by examiner

Primary Examiner—Michael O'Neill
Assistant Examiner—Sheila Clayton

(57) ABSTRACT

An audio-visual work and method of its creation which work has writings placed on the pictures of the work so that as each word or other utterance is heard a writing to be associated with the hearing is coordinated with seeing of the writing such that the future presentation of either the utterance or the writing shall evoke the other in the mind of the original viewer-listener. Each word will when appropriate appear in a legible perspective adjacent to the mouth of the utterer. The work can be displayed linearly or under computer control of the viewer/listener along with additional educational materials.

12 Claims, 27 Drawing Sheets

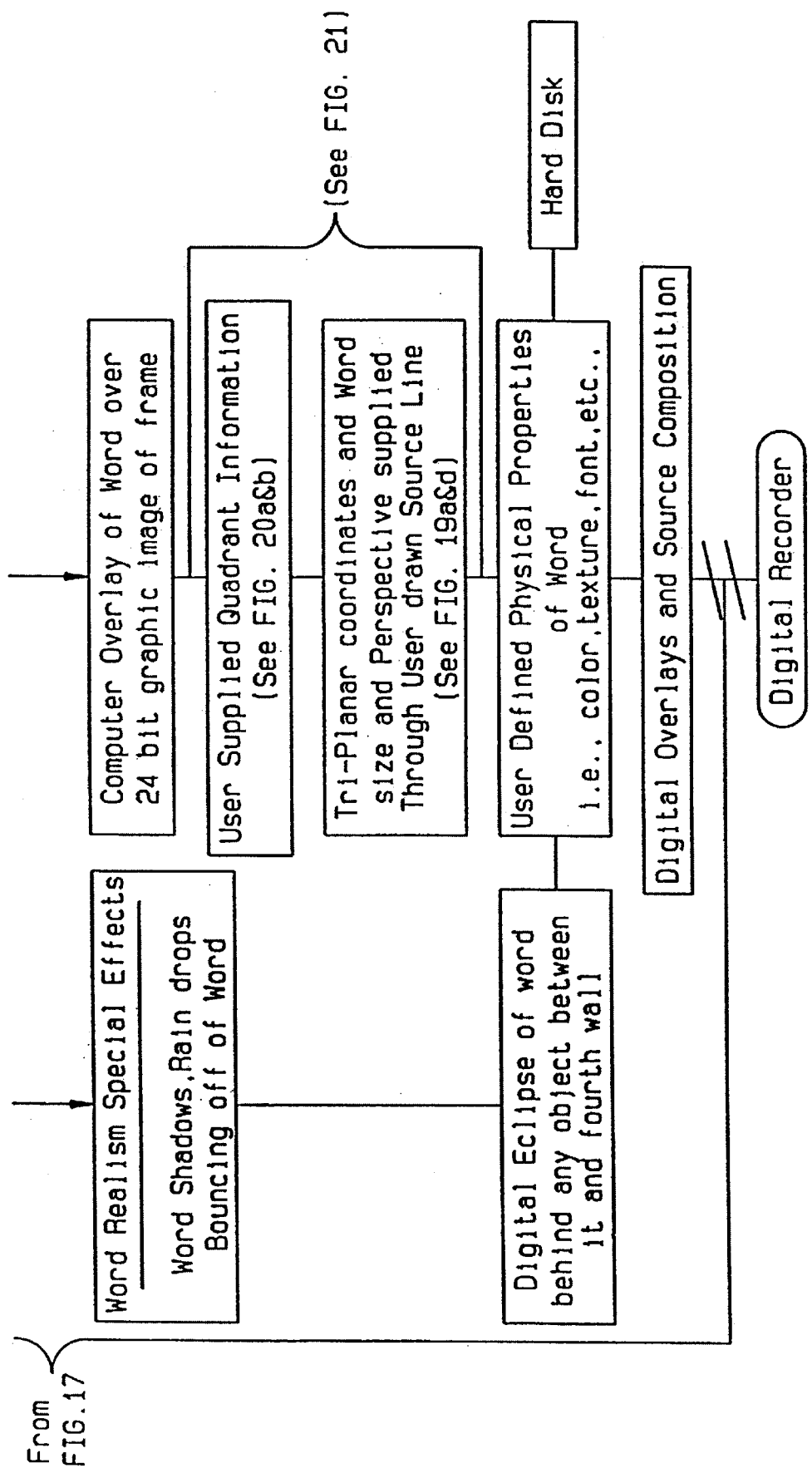

METHOD OF ASSOCIATING ORAL UTTERANCES MEANINGFULLY WITH WORD SYMBOLS SERIATIM IN AN AUDIO-VISUAL WORK AND APPARATUS FOR LINEAR AND INTERACTIVE APPLICATION

RELATED APPLICATIONS

This application is a continuation of U.S. application Ser. No. 09/054,719 filed Apr. 3, 1998, now U.S. Pat. No. 6,062,863 which application was a divisional application of U.S. application Ser. No. 08/310,458 filed Sep. 22, 1994 now U.S. Pat. No. 5,741,136 which was a continuation-in-part of application Ser. No. 08/209,168, filed Feb. 24, 1994, now abandoned, which was a continuation-in-part of U.S. application Ser. No. 08/126,341, filed Sep. 24, 1993, now abandoned.

BACKGROUND OF THE INVENTION

Prior audio-visual presentations have included placement of subtitles (U.S. Pat. No. 3,199,115 and U.S. Pat. No. 5,097,349) or balloon-type legends (U.S. Pat. No. 1,240,774 and U.S. Pat. No. 2,524,276), all to assist in language interpretation of oral portions of the presentation.

While prior subtitles have from time to time coincided with the speaking of a single word in a different language, such occurrences have been haphazard, infrequent, and without a controlled pattern to accomplish specific association of a series sounds with a series of writings. Further, location of subtitle words have been remote from the pictorial action.

Prior art flash cards, each displaying a word, have attempted to teach reading through repetitive enforced and unnatural exercise. Although having some effect ultimately, the use of such cards requires longer periods of learning and the in-person presence of a literate tutor whether a mother or school teacher. Also such cards do not provide the strength of association that the present invention delivers by providing referents within a narrative audio-visual medium that has appeal to the student outside its literacy-teaching component.

U. S. Pat. No. 5,241,671 discloses presenting on a computer screen the text of any article with some words underlined and some not underlined. When the user selects a word from the text its definition appears in a window on the screen and an audio pronunciation of the word occurs. An audio sound icon may also be displayed.

Closed-captioned works provide separate areas or adjacent boxes where groupings of words are displayed. Closed-caption systems display groups of words along the bottom of the screen or at other remote locations away from the speakers or actors. Closed-caption words appear alongside, below or above the visual pictorial scene with a different background which background is usually white. The display of sign language symbols with audio-visuals to aid the deaf are also shown in separate adjacent boxes. These box display techniques may be intrusive to viewers.

Tutorial audio-visuals have been broadcast which include instructors facing the camera and speaking words with the corresponding written words being displayed in front of the speaker as spoken. Viewer-listeners tire of such tutorial formats and particularly, younger viewer-listeners lose interest in the subject matter being presented.

RELATED APPLICATION

This application is a divisional application of pending U.S. patent application Ser. No. 08/310,458 filed Sep. 22, 1994 entitled "An Audio-Visual Work With A Series Of Visual Word Symbols Coordinated With Oral Word Utterances".

SUMMARY OF THE INVENTION

Briefly, the present invention comprises an audio-visual work and its method of creation which utilizes the natural setting of commonly-viewed works with their usual and common series of pictorial frames or segments presented along with speech and other oral utterances which works have, in addition, a series of writings thereon which are associated with or correspond to the series of utterances as sequentially heard by the viewer-listener. We refer to this as "euthetic" (well-placed) captioning. The spoken word and the written word within this context correspond if they are the same word. A spoken word in one language with a written word having the same meaning in another language are associated words in this context.

According to some embodiments of the present invention, it is a feature that each writing appears near, on or in association with the head of the utterer such that the written word, the spoken word and the accompanying facial, labial and head motion expressions may be simultaneously observed by the viewer/listener and such that an impression is created by the proximity to and alignment with the mouth that the word has emerged from the mouth. According to other embodiments, each writing appears near, on or in association with a hand or hands of a person using sign language. According to other embodiments of the invention, writing in Braille is "displayed" on a separate device in association with the spoken words of an utterer.

The present invention is used with non-tutorial audio-visuals normally created for entertainment, informational, or other purposes which audio-visuals are not literacy purposed. It may be used with such materials whether as an element of new production or as a retrofit to previously produced audio-visuals. The present invention may also be used for newly produced materials that are literacy-teaching purposed and which are designed for the application of the present invention; such newly produced, literacy-purposed materials embodying the present invention will be enabled by the invention to be less boring and less intimidating to the student than present literacy-purposed audio-visual materials.

It is a feature that the audio-visual work of the invention may be linearly presented or integrated through programming and use of a multimedia computer platform to create a work that is interactively operable by the viewer/listener to provide additional instruction.

It is a further feature of the present method that it has utility in a societal effort in which sufficient works are literated, the placement of words on audio-visuals as herein disclosed, using basic words in a language and repetitively broadcasting or otherwise exhibiting such works to a population to teach a segment of the population to recognize such words when reading.

DESCRIPTION OF THE PREFERRED EMBODIMENTS

Figure 1:
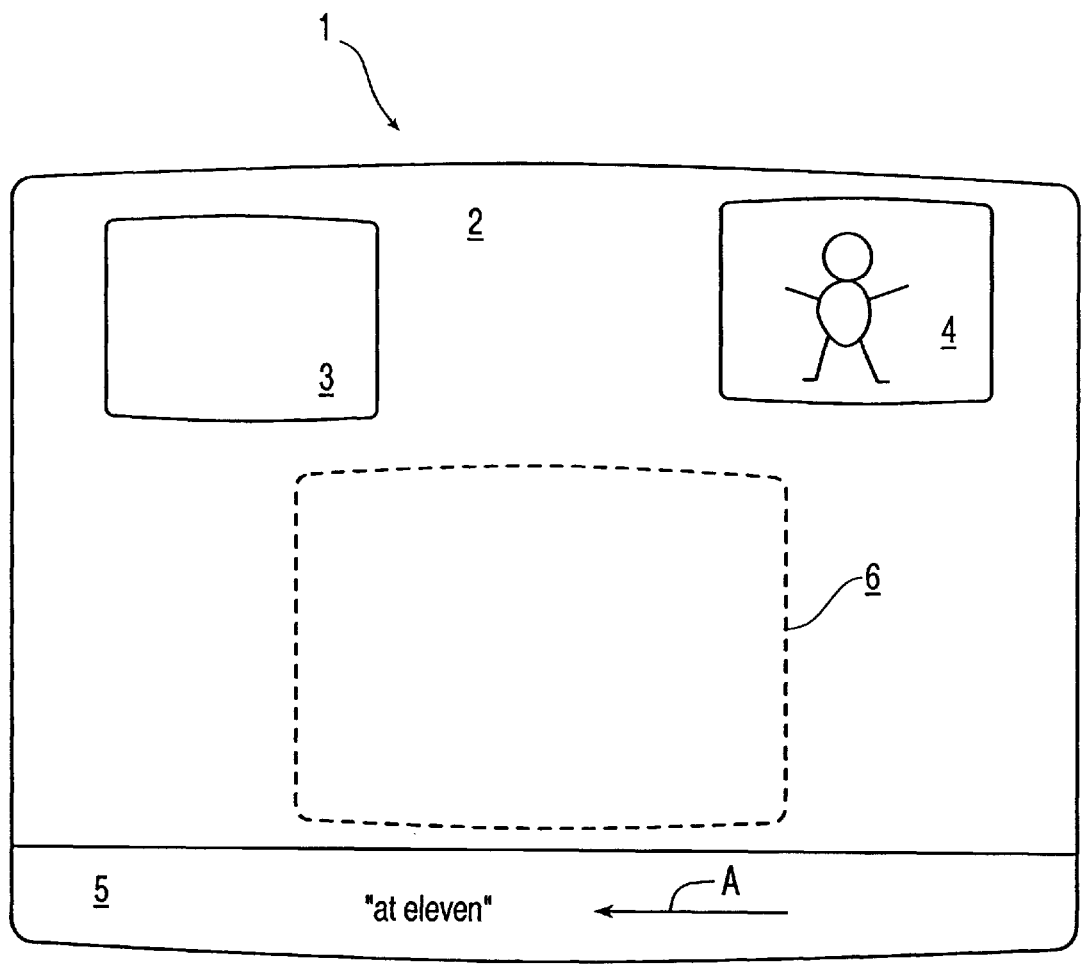
FIG. 1 is prior art.

FIG. 1 shows a prior art screen 1 carrying a typical audio-visual picture 2 (shaded area) which have a prior art closed-captioned box 3 within the picture 2 having the words "in the house"; a prior art sign language box 4 in the picture and a lower elongated word tracking area 5 in the picture with the words "at eleven". Area 5 carries words which move in the direction of arrow A. Sounds including dialogue associated with picture 2 in most part appear to emanate from sound source area 6.

Words or other symbols in accordance with the present invention are normally placed on the pictorial portion of the audio-visual within the sound source area 6; however, words may also be superimposed on that portion of the picture 2 where the listener-viewer's attention is directed by his or her interest in the audio-visual, such as where there is action, whether or not the location of such action coincides with the sound source.

The present invention, in one of the preferred embodiments, places words in the frame of reference of the speakers in the audio-visual (i.e. in planes not parallel to the plane of the viewing screen). Since the frame of reference of the viewer is the plane of the viewing screen, words moved from such plane into the actor's world are more readily and meaningfully viewed and appear to the viewer as three-dimensional objects.

Figure 2:
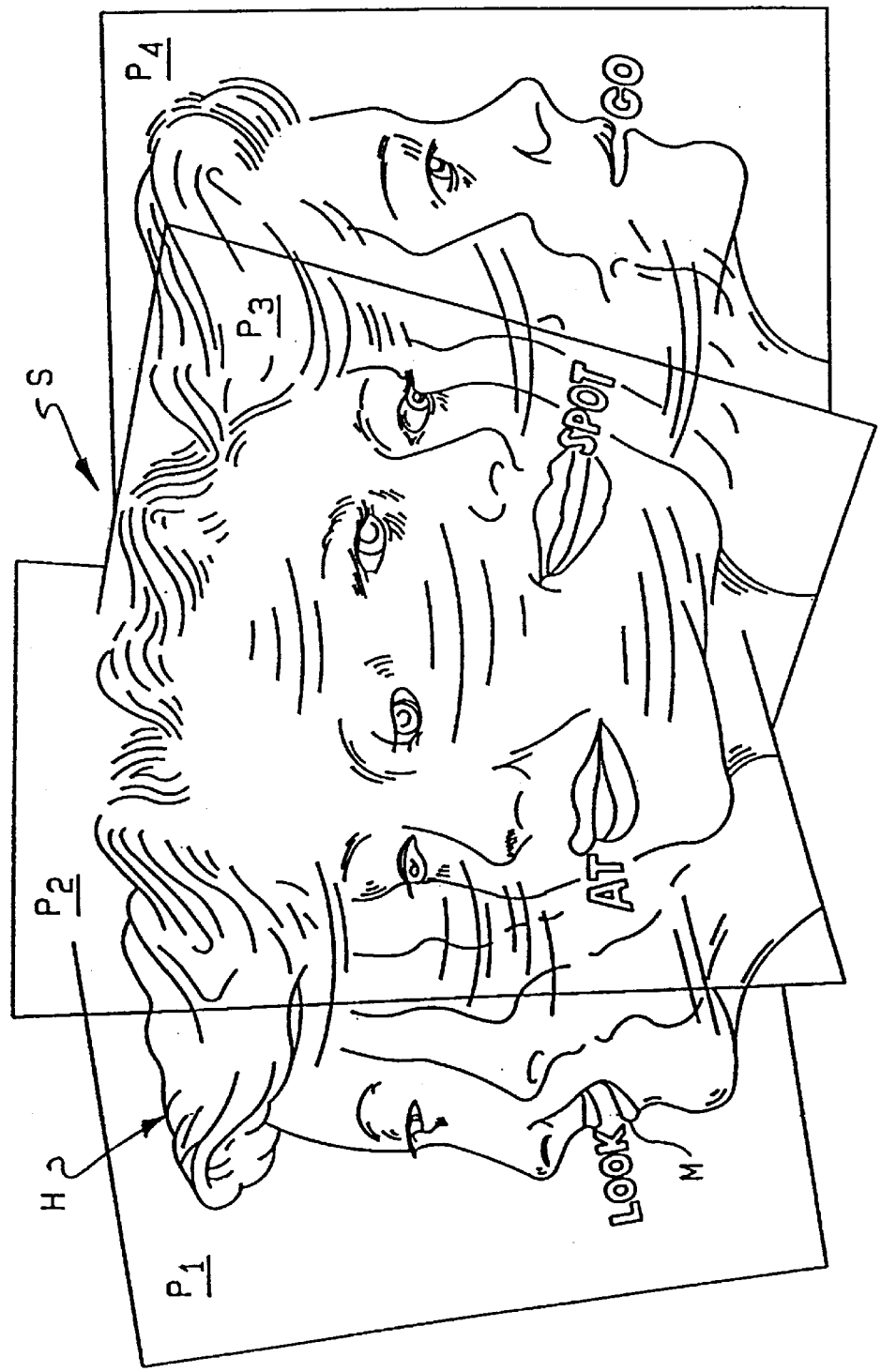
FIG. 2 is a series of elevational views of a speaker with written words appearing in different planes at the speaker's mouth.
Figure 3:
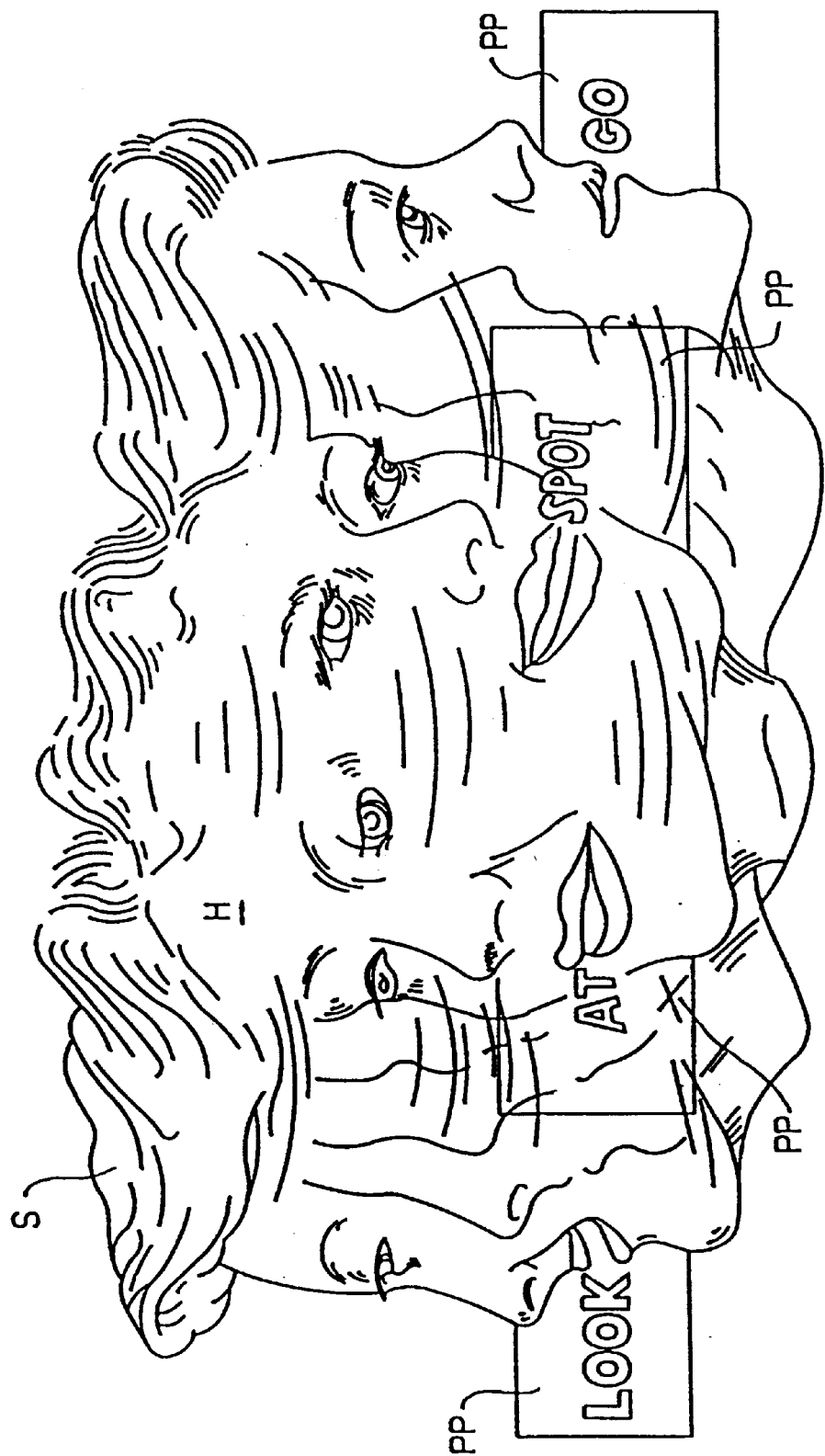
FIG. 3 is a series of elevational views of the speaker with written words appearing, all in the same plane, at the speaker's mouth.

Referring to FIGS. 2–3, speaker S of an audio-visual work has a head H and a mouth M from which the written word "look" appears in plane P, as such word is spoken. Plane $P_1$ is approximately perpendicular to a line through the utterer's ears (not shown). Each word preferably appears during the brief period of time in which the word is spoken or uttered; however, the word may appear in addition just before and just after it is spoken provided its appearance does not interfere with words and sounds spoken previously or subsequently. The criterion is that as each word is spoken there is provided to the viewer-listener an associated corresponding written word or writing. The present invention provides for the presentation of a meaningful sequence of spoken words (or other utterances) together with a coordinated sequence of written words, numbers or other writings, to accomplish the association of such spoken word or utterance and writing, one at a time, in the mind of the viewer-listener.

A purpose of the coordination of the presentation of a plurality of written words or writings, one at a time, with corresponding spoken words is to provide the viewer-listener with the opportunity to associate in a natural setting such sounds and sights for the purpose of remembering that the sound and sight are to be associated such that future presentations of either the sound or the sight shall evoke the other in the viewer-listener. While this purpose is for literacy, foreign language study and education, another advantage of the invention is increased clarity of understanding in that a viewer-listener may receive and understand the word orally or visually or by both stimuli depending on his or her ability, attentiveness or location with respect to the unit displaying the audio-visual work. A second advantage is the translation of foreign sound tracks with heightened understanding provided by location of the written translation at or near the mouth; and a third advantage is to achieve a simultaneous bilingual writing presentation by presenting two writings, one in the utterer's language and the other in a different language and both occurring simultaneous to the utterance. Where utterances may be delivered in a series so rapid that visual coordination with writings is not practical, that portion of the audio/visual medium so affected may be digitally expanded as to sound and expanded visually by either digital or analogue means so as to enable comprehendible association.

Bigrams, trigrams, or quadragrams (two, three, or even four word sequences) may displayed simultaneously where the goal is comprehension by the deaf or non-speakers of the language of the soundtrack of the audiovisual work and single word presentation is too fast; in both cases, the intention is that the captions will be offered in a language the viewer already understands. In that case, the number of words should be the smallest number of words that will still allow an adequate reading comprehension time window for the phrase in question. This approach is a replacement for closed-captions or foreign film subtitles where the goal is limited to comprehension of the narrative or entertaining program as opposed to associations with utterances.

According to another embodiment of the present invention, one or more words are positioned in association with the hand or hands of a person speaking in a sign language, such that there is a correspondence between such words and a single sign language element. In this way, the viewer-listener is provided with the opportunity to associate in a natural setting such words for the purpose of remembering that the words are associated with that sign language element.

According to yet another embodiment of the invention, words may be placed on an audiovisual work so that they are visible only to a viewer who uses a special reading device. This is analogous to three-dimensional presentations that are visible only when the viewer wears a special type of eyeglasses. Indeed, a special type of eyeglasses is the preferred method for carrying out this embodiment.

The words of the present invention are displayed as an integral part of and superimposed on the pictorial scene of the work. The pictorial scenes include components such as human figures, furniture, sky, a background citiscape and so forth. The words may be superimposed on one or more pictorial components and by consequence prevent viewing of a portion of the pictorial component or prevent partial viewing of a portion of the pictorial component where the written word is translucent or semi-transparent or the word is composed of wire-framed letters.

Since the presentation of more than one written word to the viewer-listener at one time while the words are being spoken makes it difficult if not impossible to correctly associate the right sound with its corresponding written word, it is important that each sound and its corresponding written word be made available in a manner that makes it easy for the listener-viewer to associate the two elements. To avoid distraction and confusion, each spoken word should be accompanied by its sole written associate with the possible exception of an added pictogram of such word, sign language representation of such word, or a foreign translation of such word. Such written word or words may be displayed before, during and after the word is spoken, provided that such display does not take place while the preceding word or succeeding word is spoken.

More than one word or symbol may appear during the utterance provided each word and symbol is to be associated with the utterance. For example, if the word "thank-you" is spoken, the word "thank-you" and the word "merci" may simultaneously appear.

During an audio-visual presentation there are speaking periods of time in which words are being spoken and non-speaking periods in between. In the one-word-at-a-time procedure of the present invention the written word appears only during the period comprising (1) the non-speaking period following the speaking of the prior word (2) the speaking of the word and (3) the non-speaking period following the speaking of the word before the next word is spoken.

By presenting alphabet-based words in a pictorial setting such words, to the mind of the non-literate student, are logograms to be memorized employing that portion of the brain which records whole, visual images, much as a film receives light to create a photograph. The inventive segmental presentation of the alphabet-word in simultaneous accompaniment with either a spoken or pictogrammic referent, or both, creates a recoverable association in the mind of the student between the written word (which is perceived as a logogram although "normally" scripted) and the simultaneously presented referents). After some repetition, subsequent presentations of the alphabet-based word (logogram) will recall in the mind of the student the referent(s), i.e., the spoken word. This, of course, defines the act of reading, the teaching of which ability is a purpose of the present invention.

The same process of pairing spoken and written words also teaches, in reverse manner, a student who is literate in given language to be able to speak it. In this case, the referent is the written word or logogram and the learning target is the spoken word.

A key to the intensity of the learning, particularly by infants, is that the associations be presented in an environment that is "natural", similar to the environment in which the child learns to speak. The environment in which a child learns to speak, which normally and generally does not include formal speaking lessons, is the same type of environment the present invention delivers audio-visually. In the preferred linear embodiment of this invention the audio-viewer is provided with an environment of a story or other presentation whose primary purpose is not the teaching of literacy. When one learns to talk, one is exposed to visual images or actions, respectively demonstrated or implied by agencies (such as parents) in the learner's environment, which serve as referents that will achieve association with parallel utterances. The environment of the present invention is one where visual images or actions, respectively demonstrated or implied by agencies (such as parents) in the learner's environment (i.e., a child's), serve as referents that will achieve association with parallel utterances. Such environment includes meaningfully seriatim utterances, inasmuch as agencies in a learner's environment, do not as a rule make random utterances. Such a natural language learning situation is presented in the typical motion picture wherein natural communication situations are depicted and wherein repetitive audience exposure to the same word, through natural recurrences during the film, takes place. The natural environment and the motion picture emulation both provide associations between actions and objects and their corresponding descriptive utterances; the present invention extends the association opportunity to the written word in the audiovisual emulation of the natural environment.

The present method is able to teach reading by presenting to the student whole words as distinguished from syllables or letters of a word. Viewing and remembering a whole word is akin to viewing and learning a symbol, such as a picture of a cat or a Chinese language character, in that such whole word is, it is believed, processed by the human brain in the same way. Viewing each word as a whole (or sight reading) provides a teaching based on developing associations in the mind that are visually memorized or imprinted and recovered through association rather than through human brain analysis which is required for alphabet-based, syllabic, or phonetic reading.

Where two writings, i.e. one in written form and the other in pictorial form, are caused to be displayed corresponding to a single word spoken, the two writings may merge into or out of one another to indicate that the two are associated or even the same. For example, as a person in a video speaks the word "cat", the written word "c-a-t" could mutate into the pictogram of a cat.

Whether the associations created by the present invention are in the context of an audio-visual now existing or to be created, the associations created by the present invention occur in normal, natural pictorial settings. As examples, such associations could occur in photoplay scenes where a detective and a suspect converse; in videos where a performer sings or in TV newscasts where a weatherman speaks and points to a map. In all the cases just cited, the purpose does not necessarily involve literacy.

The present invention is also applicable to teaching lip reading where as the utterance is made and as the writing is displayed the lip movement is simultaneously made observable as part of the visual portion of the work.

One of the advantages of positioning words at or near the contextual source within the area of the displayed picture is to make it easier for the viewer to see the word as he or she hears the word while maintaining focus on the action in the work as it takes place. Although the eye can see peripherally words positioned at the fringe edges of the viewing screen or even outside the pictured area, it can only read them with difficulty while still maintaining a meaningful focus on the action elements of the audio-visual work. It is for this reason, among others, that the present invention is superior to closed-captioning. Closed-captioning also presents more than one word at a time, which prevents the association of one word with one sound. Furthermore, the present invention presents the words in dimensional relation to the speaker which reduces obtrusion and minimizes screen area occupied by the written word.

When two people are conversing whether facing one another or not, a single plane between the two people may serve as the plane upon which written words will be displayed. This technique can also be used when one of the speakers is off-camera where the audience is aware of the relative position of the off-camera speaker.

The color, shape and other characteristics of the letters of each written word are designed to be unobtrusive. For example, if the background pictorial component upon which the word is superimposed is a dark blue, the letters of the word may be a light blue or other shade of blue. Also, a written word may be rendered translucently or semi-transparently such that it permits a partial continued viewing of background visuals. Also, a word may be color, font, or otherwise coded to its source.

Turning again to FIGS. 2–3, as the speaker's (S) head (H) turns, plane $P_1$, which is approximately perpendicular to a line through the speaker's ears, moves to three (3) additional positions $P_2$–$P_4$. As the word "AT" is spoken it appears in plane $P_2$ in perspective; as the word "SPOT" is spoken it appears in plane $P_3$ also in perspective and finally as "GO" is spoken it appears in plane $P_4$. Each word is located at or near or even on the head and, preferably at or near the mouth (M) of the utterer as it is spoken. Note that as the speaker's (S) head (H) has turned it has also tilted to raise the chin (see plane $P_4$). Writing orientation preferably reflects head orientation side-to-side and up-and-down.

In FIG. 3, all spoken words appear in planes PP which lie in or are parallel to the screen upon which the audio-visual is presented.

Figure 4:
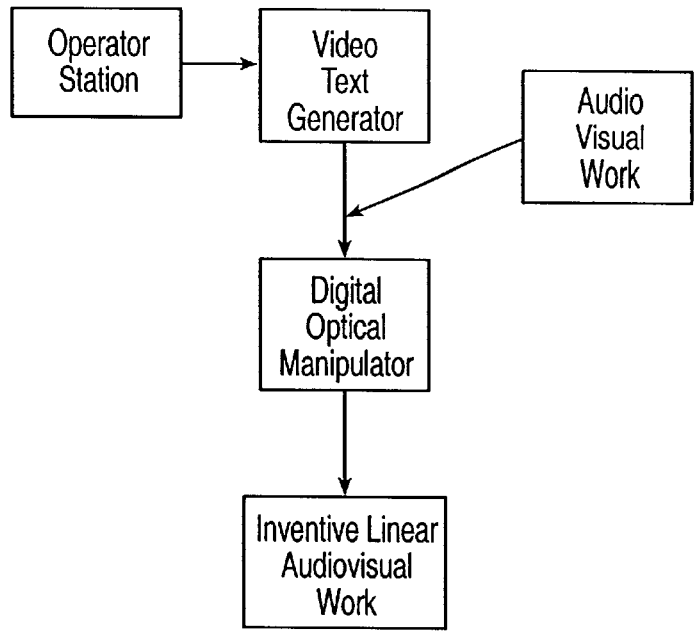
FIG. 4 is a flow chart showing steps and items of equipment for use in the present invention.

In FIG. 4, the apparatus for creating the audio-visual work is described including an operator station; a video text generator to generate the writing desired (such as the word "look"); audio-visual work input means for providing a work that has had no writings yet placed on it; a digital optical manipulator providing means for combining the text and such audio-visual work to provide the utterance/writing coordination of the present invention in proper plane orientation. This manipulation creates an inventive audio-visual work in which such coordination occurs throughout the work and can be viewed and listened to without interruption in its presentation which embodiment is a linear embodiment of the present invention.

Groups of letters are affixed, imprinted, superimposed or otherwise located on that portion of the picture that is most likely to be viewed as the word is spoken. When the head of the utterer is visible, the location shall generally be at or near the mouth so as to suggest that the word has emerged from the mouth. This sequence is continued for all or a substantial number of utterances for the entire work or, if desired, for a segment of the work. Letters may be of any size, font, or color. In one preferred embodiment, size, font, color, or any other graphic attribute are chosen so as to reflect background colors and the emotional and intentive content of each utterance. As to background, each written word shall be by default translucent, semi-transparent, wire-framed, or in a color that is a shade of the background color, sufficiently differentiated from the background color so as to achieve visibility without leaving a retinal halo or ghost image once the word is gone. As to emotion, intent, or meaning, angry words, for example, will have a red blush with a sharp-edged typeface while lullaby lyrics will be pastel tinted with a soft, cursive typeface. Emotionally neutral words will be presented in the default color. The purpose of the graphic attributes is to provide the viewer listener with a dynamic graphic parallel to the nuances of the utterances rendered through the variables of volume, tone, pitch, or other vocal attribute and to thereby enhance the goal of an association that is recoverable in the future by the mind.

Natural communication situations are prevalent in audio-visual works. Such situations include a detective interrogating a suspect as referred to above. Placing words on scenes including natural communication situations provides a vehicle for creating the association of sound and writing desired while the viewer-listener remains attentive to the natural communication of the work.

Figure 5:
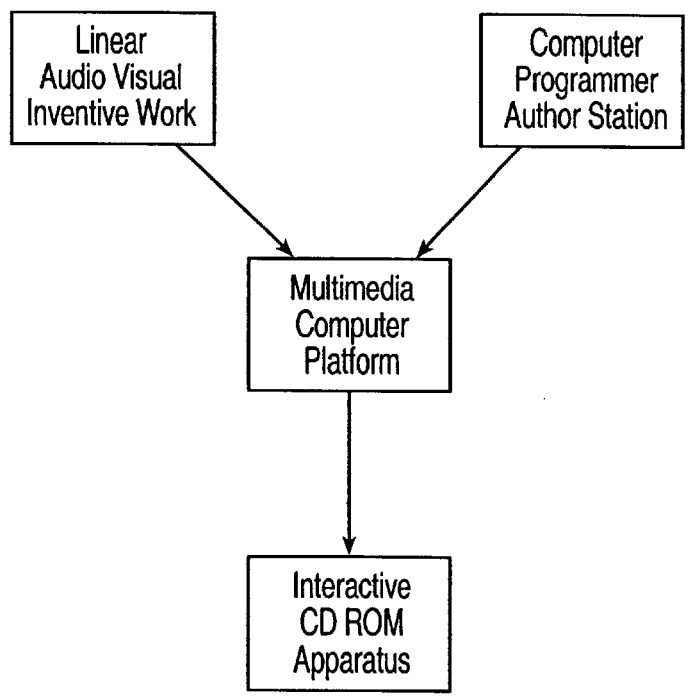
FIG. 5 is a further flow chart showing creation of an interaction work including the simultaneous audio-visual utterance/writing of the present invention.

Turning next to FIG. 5, the linear embodiment of the invention is used to create an interactive embodiment by creating a computer program permitting the viewer/listener to stop the audio-visual presentation to bring up for viewing on the screen on which the audio-visual is being presented a menu for providing by selection, word definitions, syntax and sentence context usage or other information. The interactive work is presented by operation of the viewer/listener using a programmable educational apparatus for using such program to display the work, stopping the work to view a selected writing and to obtain additional information relating to such writing.

Figure 6:
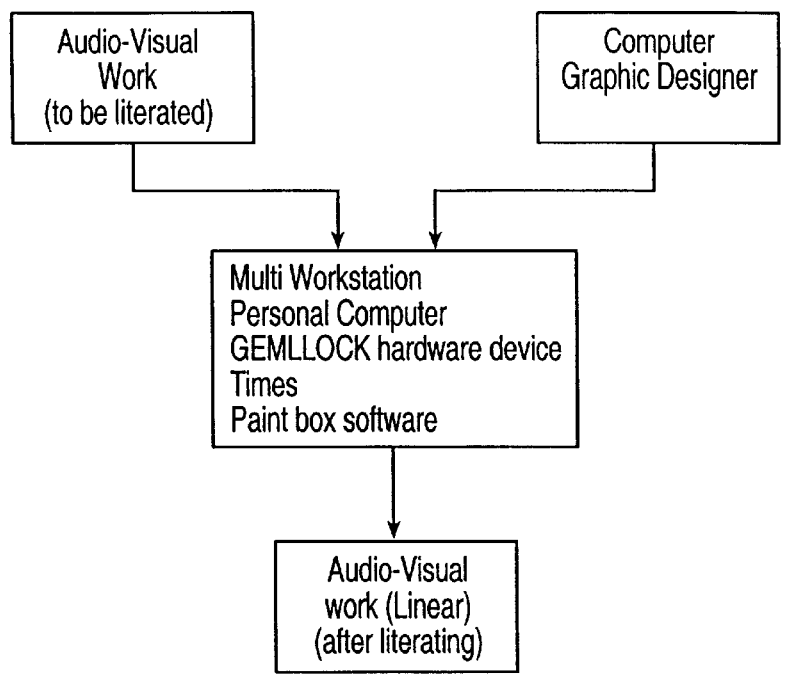
FIG. 6 is a flow chart showing further steps and items of equipment for using the present invention.

Turning to FIG. 6, audio-visual works are created by a computer graphic designer at his or her work station where the video signal of the work (in analogue or digital form) is presented on a screen to the designer. In working with frames (pictorial sequences of 1/30th of a second), the designer creates a computer graphic or text (i.e. a word) and superposes it on the video signal of the frame or frames depending on the length of time the speaking of the word takes. The length of time it takes to speak a word varies with a large number of words in everyday English (or other language) conversation taking between 1/60th and ½ of a second. By employing animation and using paint box software additional characters may be given to the font of letters in the word and the orientation of the word in a selected plane.

Figure 7:
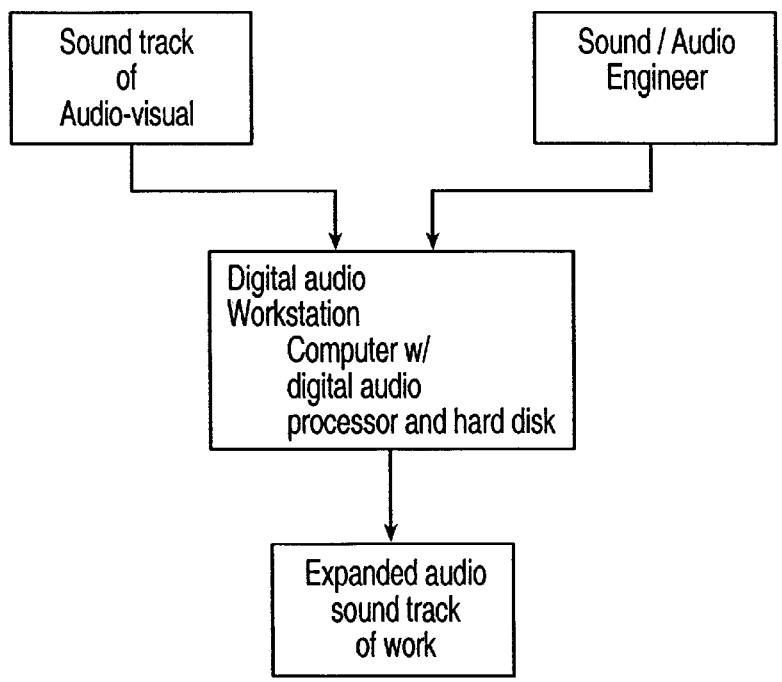
FIG. 7 is a flow chart illustrating a method expanding the audio portion of an audio-visual to assist in coordinating sound and writing.

FIG. 7 illustrates the method extending the time a word is spoken in an audio-visual for the purpose of providing longer presentation of the associated written word. This extension or spreading out of the time a word is heard is accomplished by digitizing the sound of the word on a hard disk as a wave form and then reconfiguring the wave form. Such a technique does not distort the pitch or the tone.

Figure 8:
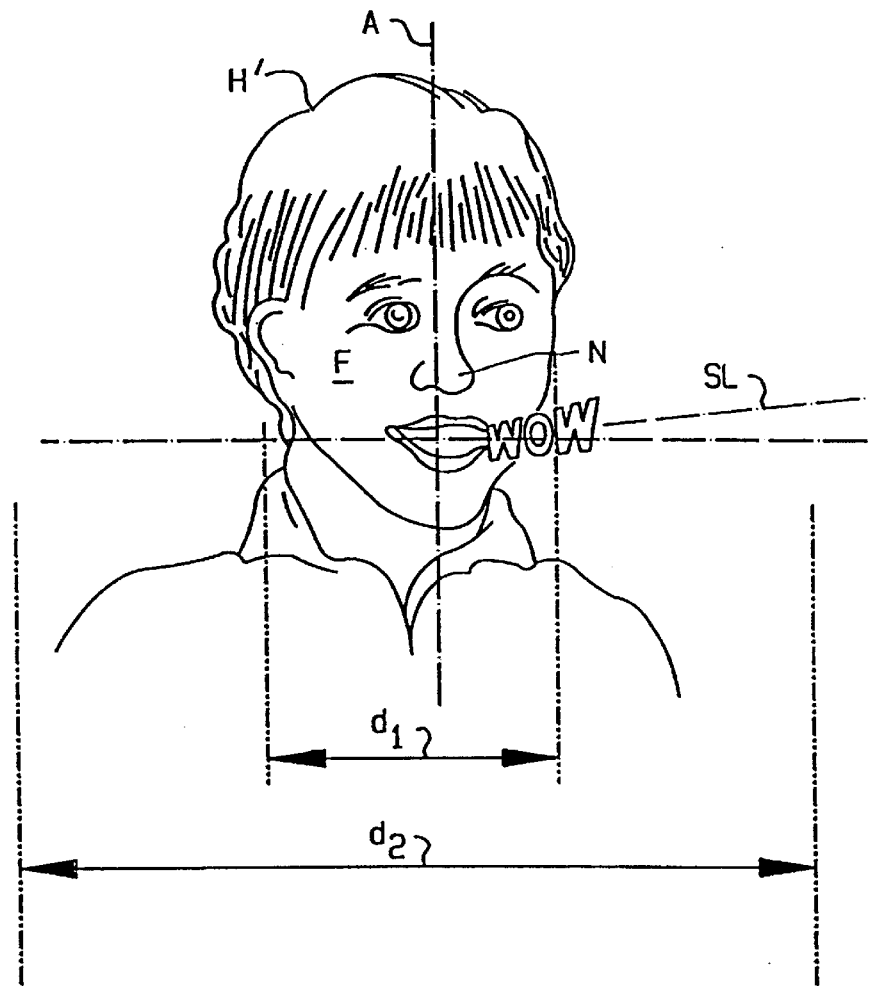
FIG. 8 is a front elevational view of a speaker with a word near his mouth.

Head (H') of FIG. 8 is facing to the viewer's right as indicated by dashed source line (SL). Line (SL) lies in speaker reference dialogue plane ($P_5$) (not shown). Vertical viewer reference plane (A) is viewed by the viewer as a line. This plane remains fixed. Line (SL) goes through word "WOW" like a barbecue skewer.

The distance the beginning of the word (WOW) is positioned from the head (H') of a speaker is preferably within a distance ($d_2$) which is twice the width ($d_1$) of the speaker's face (F) having nose (N) (see FIG. 8). This positioning of the word (WOW) in the range of 2 $d_1$ provides good results for scenes where the speaker's head is in a close-up position. Where the head is distant as in a long shot, the word may be larger than the head but still adjacent to head (H') or shifted to an object of viewer interest and, in such instance, distance ($d_2$) may be 3 or 4 times distance ($d_1$).

Figure 9:
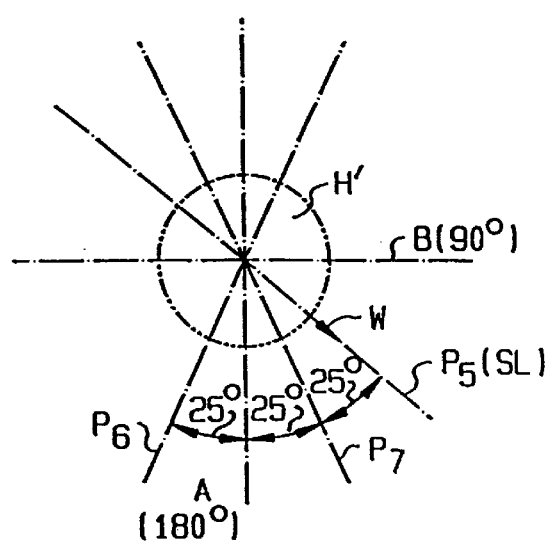
FIG. 9 is a partial schematic plan view of FIG. 8 with dialogue planes shown.

FIG. 9 is a schematic plan view of FIG. 8 showing dialogue plane ($P_5$), plane A (the 180° viewer reference plane) and B, the 90° plane. Dialogue plane ($P_5$) which has source line (SL) therein includes the word "WOW" which appears in such orientation. Words appearing in other dialogue planes ($P_6$) and ($P_7$) which are 25° from viewer plane (A), the 180° viewer reference plane, are readable but since words placed in dialogue planes closer to viewer reference plane (A) (the viewer's principle plane of vision) are difficult to read such positioning (in this "blockout area") is rarely used in the practice of this invention.

Figure 10:
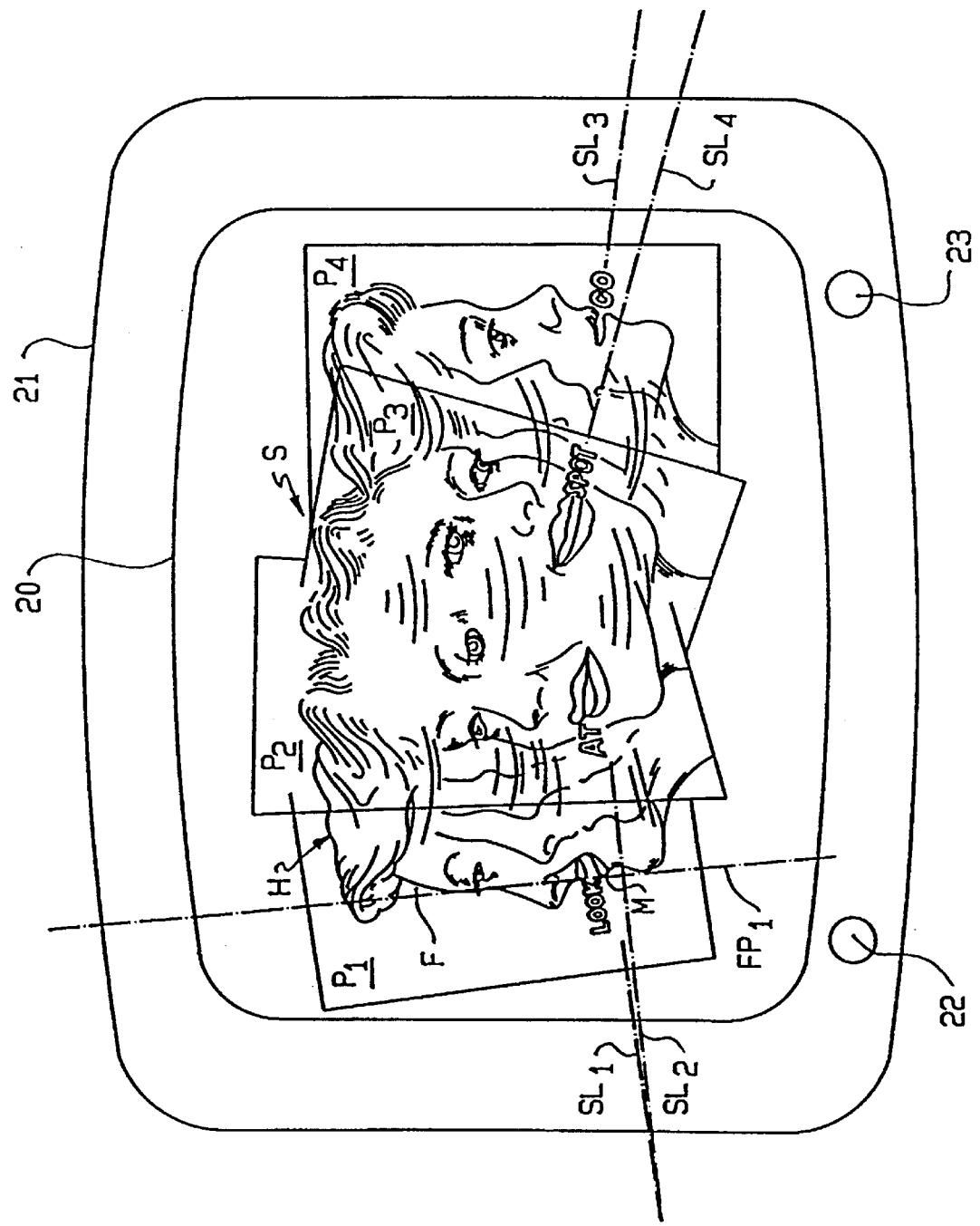
FIG. 10 is a perspective view of a television set screen with a speaker in various positions.

FIG. 10 shows television screen 20 of set 21 with control knobs 22, 23. The speaker's head/face position is shown in multiple views as it was shown in FIG. 2. The view to the left of screen 20 shows head (H), face (F), dialogue plane ($P_1$) with source line ($SL_1$) in such plane. Face plane ($FP_1$) is perpendicular to the dialogue plane ($P_1$). Source line ($SL_1$) is perpendicular to face plane ($FP_1$). Face planes generally lie in planes perpendicular to the horizontal when the speaker is in or standing or sitting position. Source line ($SL_1$) bisects linearly the word "look". Other source lines ($SL_2$), ($SL_3$) and ($SL_4$) are shown lying in their respective dialogue planes ($P_2$), ($P_3$) and ($P_4$) each of which lines bisects linearly its respective word.

Figure 11:
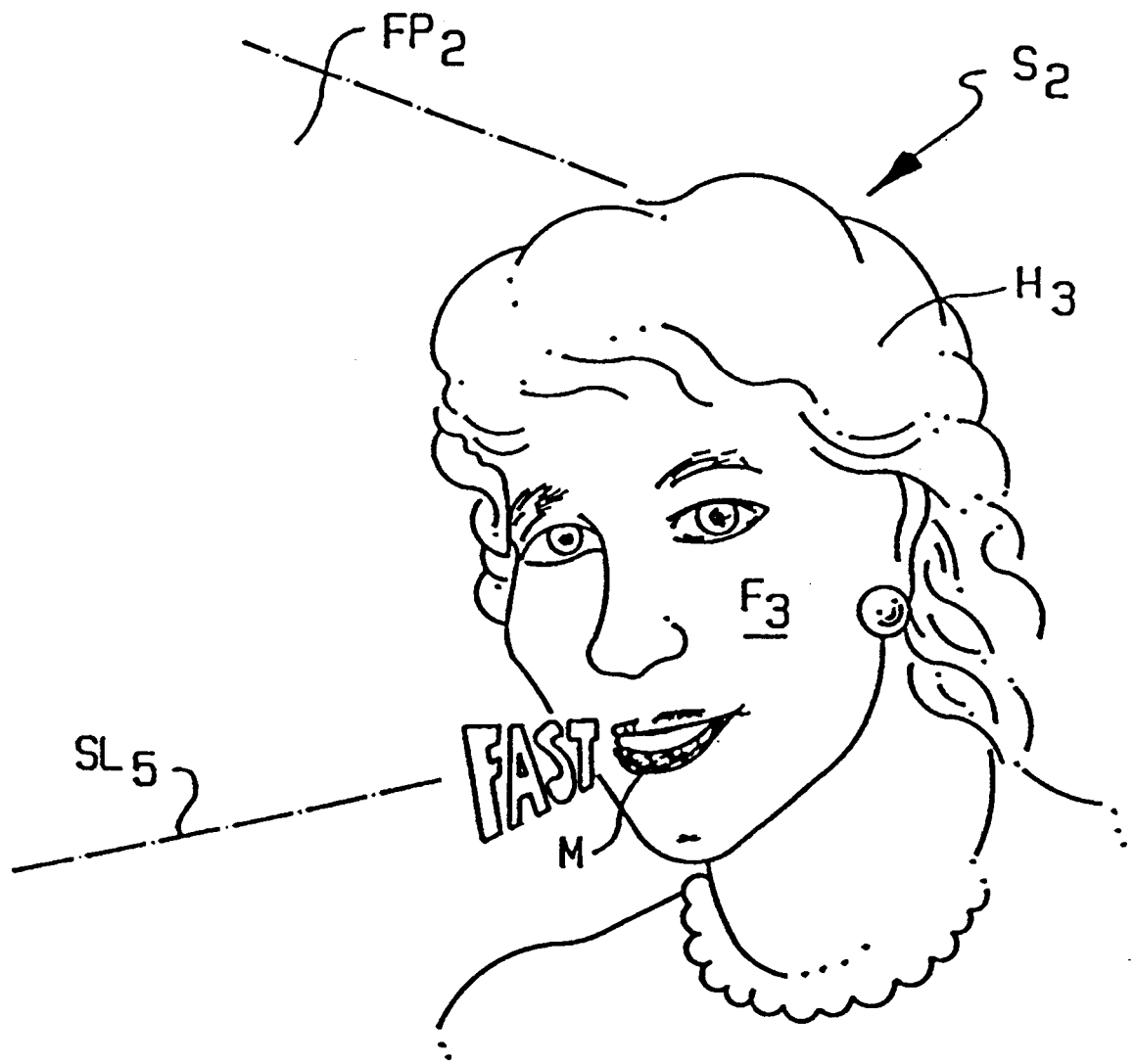
FIG. 11 is another perspective view of another speaker.

Finally, FIG. 11 shows a speaker ($S_2$) with head ($H_3$) face ($F_3$) and mouth (M). Face plane ($FP_2$) is perpendicular to a dialogue plane (not shown in this figure). Source line $SL_3$ which lies in the dialogue plane (not shown) bisects the word "fast". Since head ($H_3$) may move in any orientation as speaker ($S_2$) reclines or turns her back to the viewer, words on source line ($SL_3$) as spoken by head ($H_3$) in such orientation are in each instance placed in the dialogue plane except where the dialogue plane's orientation is such that the word as placed lacks legibility to the viewer. For example where speaker ($S_2$) is in a standing position and facing away from the viewer, the word "fast" if placed in the dialogue plane would be at an angle to the viewer where the word "fast" would be illegible. To avoid such illegibility the word is placed in a plane as close to the dialogue plane as possible where the word "fast" is legible. In such a case the word "fast" would be shown in a perspective orientation in such selected plane to give the impression that the word was going away from head ($H_3$).

Where time permits, the word "fast" may originally appear in a position obscuring a portion of the mouth (M) and then be moved quickly along the line ($SL_5$) of the dialogue plane. Alternatively, for example, if the word is to appear on the screen for 0.024 thousandths of a second, the word may appear for 0.008 thousandths of a second partially on mouth (M) and then move along line ($SL_3$) for 0.008 thousandths of a second and finally stop on the line for another 0.008 thousandths of a second before disappearing.

The purpose of placing words on a source line (SL) and in planes in perspective as set out herein is to cause the word to appear if it came out of a mouth and thereafter appeared as an object in the three-dimensional space of the audio-visual scene. As an object, the written word is subject to the same physical laws that any other object is subject to. Thus, if someone walks in front of a speaker in an audiovisual work using the present invention, the speaker's speech may be muffled and view of his written word may be momentarily blocked partially or wholly. The purpose of this aspect of the invention is to make the words appear to be real objects, a concept very acceptable to young minds in particular who will find the words "user friendly" rather than abstract.

Words are positioned to appear in perspective with the letters of the words increasing or decreasing in size (see FIG. 8 where the "w" to the left is smaller than the "o" which in turn is smaller than the "w" to its right). Words in perspective appear to have direction including the appearance of moving in such direction. A word in perspective near a speaker's mouth appears to be coming from the mouth. Words are placed as close to the mouth as possible without interfering with those facial expressions of the speaker which are part of the communication.

Not all words spoken during a work need have a corresponding written word displayed since selected periods of running of the work may offer special difficulties in literation or for other reasons may not require literation.

The preferred use of the invention is in emplacement of the words or other alpha numerical symbols or other writings on tapes, films, computer diskettes, CD ROMS or other media in a meaningful sequence which provides association with the oral component of the tape or film or CD ROM or computer diskette in the manner described above. Such sequencing may continue throughout the film or tape from beginning to end. Audio-visual works of the present invention have preferably entertaining or otherwise contextually meaningful subject matter and content. The learning by the viewer/listener occurs without specific effort on his or her part as he or she enjoys the entertaining or other subject matter.

The present invention creates within a pictorial area of the work an impression of the spoken word as if it were visible in that each word, as viewed, has dimension, color, font, motion and other characteristics. The dimension of the word is the orientation of the word in the plane of the display screen or in a plane at an angle to such plane. Words in such orientation are three-dimensional as are other components of the picture.

Writings may include letters, words, pictures or other symbols.

According to another embodiment of the present invention, the writings are displayed in Braille, preferably on a separate device that a person (e.g., a sight-impaired person) can use while listening to an audio program. Analogous to other embodiments, a one at a time correspondence is established between the Braille writings and the spoken utterances, such that the user is provided with an opportunity to associate in a natural setting such writings for the purpose of remembering that the writings are associated with those utterances.

EXAMPLE

An entertaining video game is employed in which an inventory of pictogrammic (literal drawings) referents are available to the player. The pictograms will be cursor draggable. One mouse click on any referent will result in the referent fading into ("morphing") its written word equivalent (logogram) while a voice-over or talking head utters the word.

A goal of the game is to create a row of pictogrammic referents which creates a meaningful seriatim. Once the player has arranged such a row, a double-click of the mouse will result in the referents morphing into written words (logograms), from left to right, one at a time, and in simultaneous accompaniment with the appropriate spoken referent. Then the meaningful seriatim is repeated aloud, left to right, by the utterer, each word being suddenly "backgrounded" by a referent.

In playing of the game a drag created arrangement of referents that is not meaningfully seriatim will result in no outcome when double-clicking is undertaken and no points are scored.

Nuances of color and font graphics may vary in accordance with the natural flow of the meaningful expression of dialogue. As such, the overall "organic look" of the invention will create a novel, standardized "emotive graphic vocabulary". As examples, the following colors and graphics may be used for the following emotions:

| Emotion | Color | Graphic |
| --- | --- | --- |
| Happy | White or Pink | Twinkle/sparkle |
| Sad | Blue or Black | Gothic/ |
| Angry | Red | Bold |
| Sexual | Purple | Undulating |

Font and color nuances might also be used to associate physical realities, such as found in nature.

| Physical | Color | Graphic |
| --- | --- | --- |
| Cold | Gray/Ice-Blue | Icicle |
| Hot | Orange/Red | Flame |
| Wet | Milky | Drop |

Such associations are based on common sense and/or pre-existing studies linking the associative graphic effects of color, texture, etc., on human emotions and learning retention. In addition, the capabilities of the present graphic computer software including visual phenomena, such as "glowing" and "radiating," can be layered in for additional associative impact.

Figure 12A:
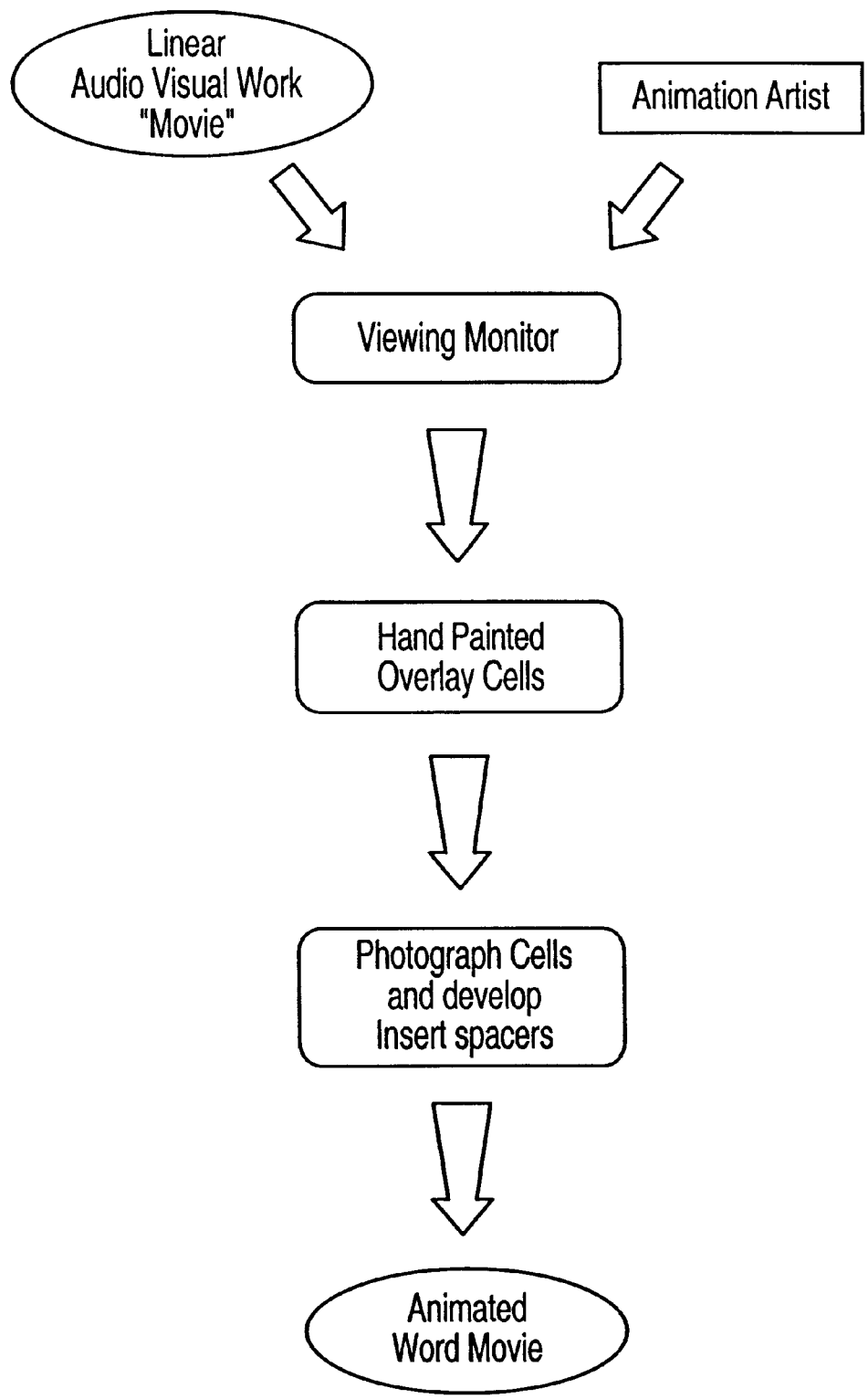
FIGS. 12a–b are flow charts of a method of carrying out euthetic captioning according to the present invention.
Figure 12B:
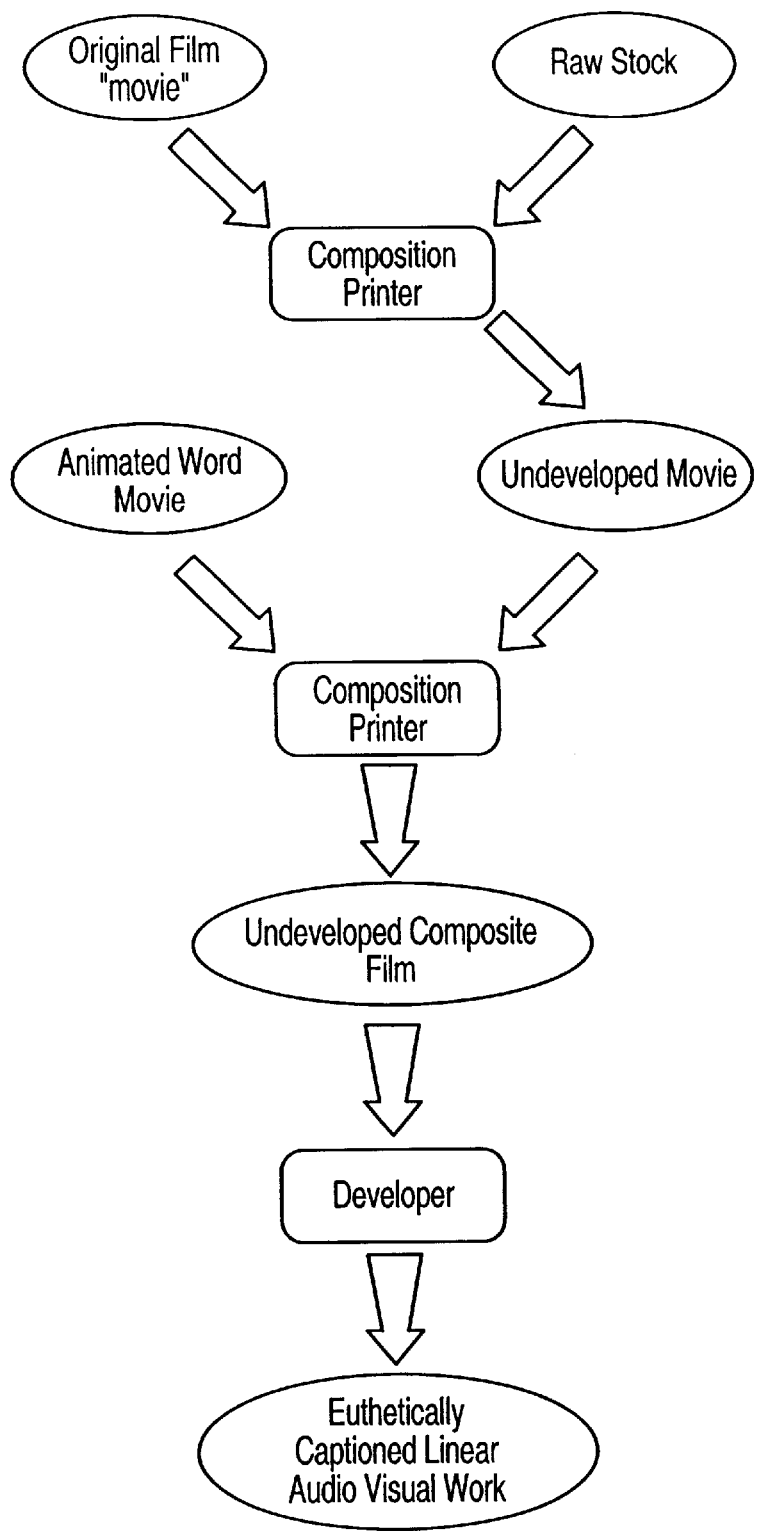

Euthetic captioning in a narrative context according to the present invention may be accomplished in a number of ways. FIGS. 12a–b show steps for applying euthetic captioning manually.

Figure 13A:
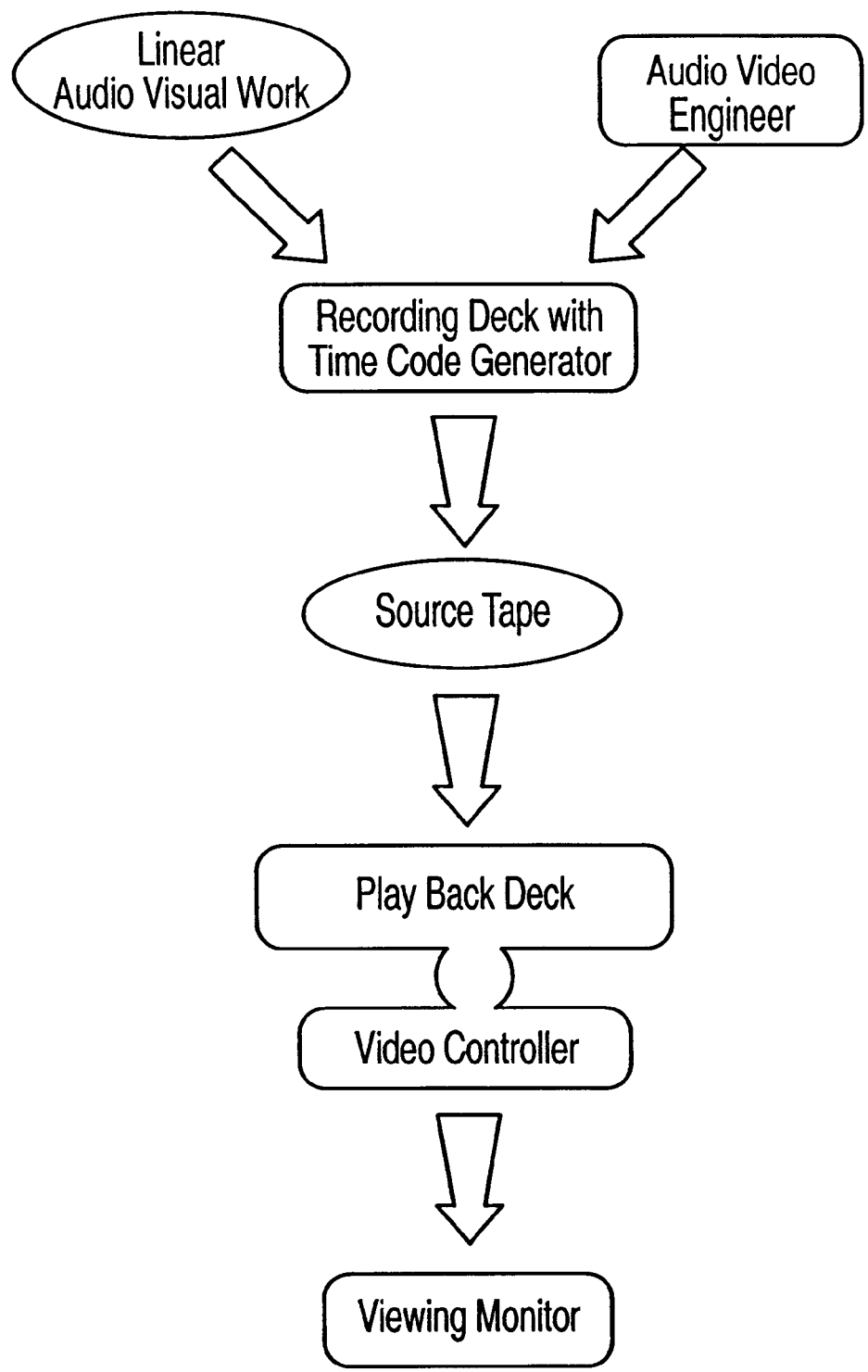
FIGS. 13a–b are flow charts of another system and method of carrying out euthetic captioning according to the present invention.
Figure 13B:
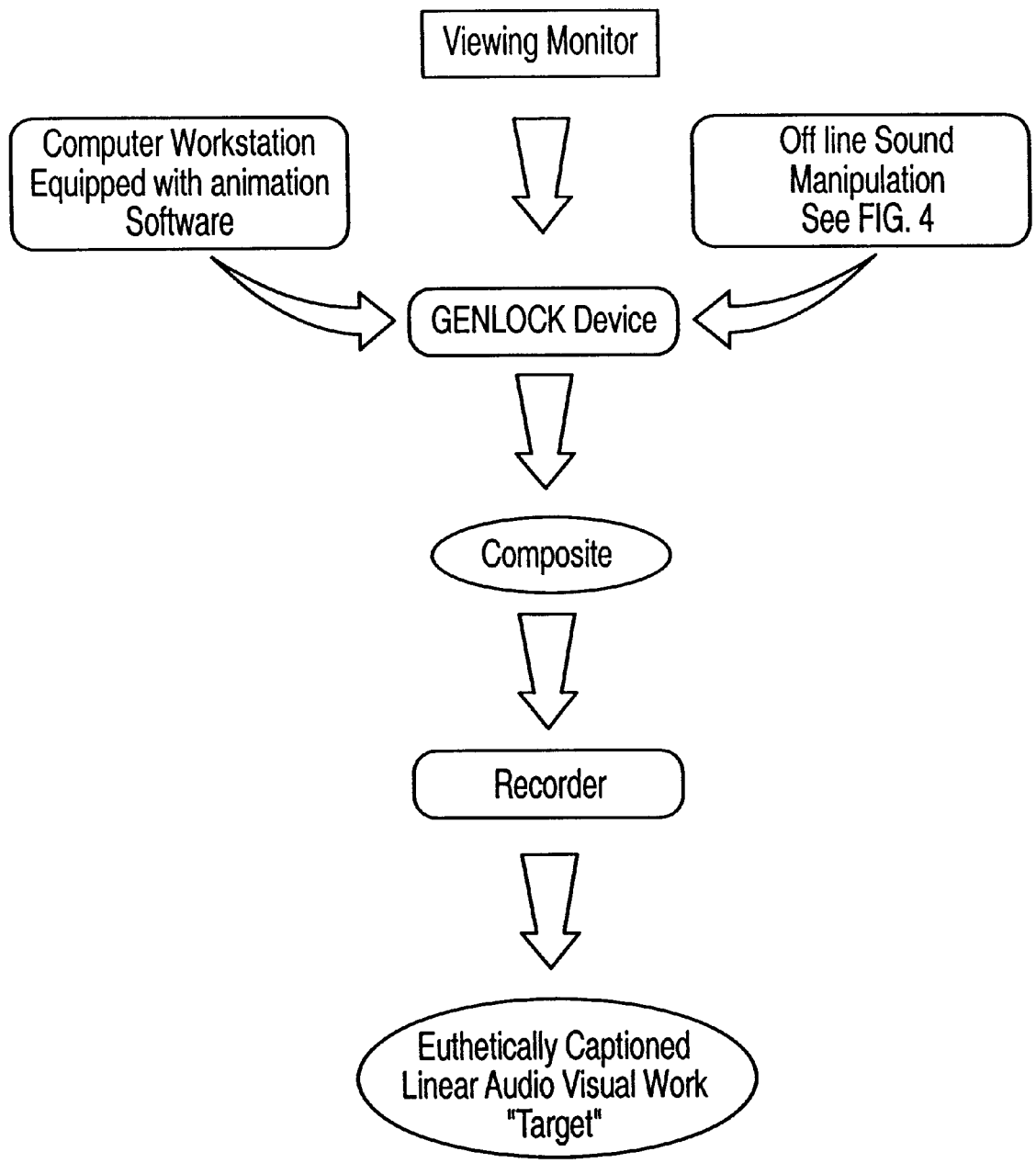

FIGS. 13a–b depict a video direct system and method of applying euthetic captions.

Figure 14:
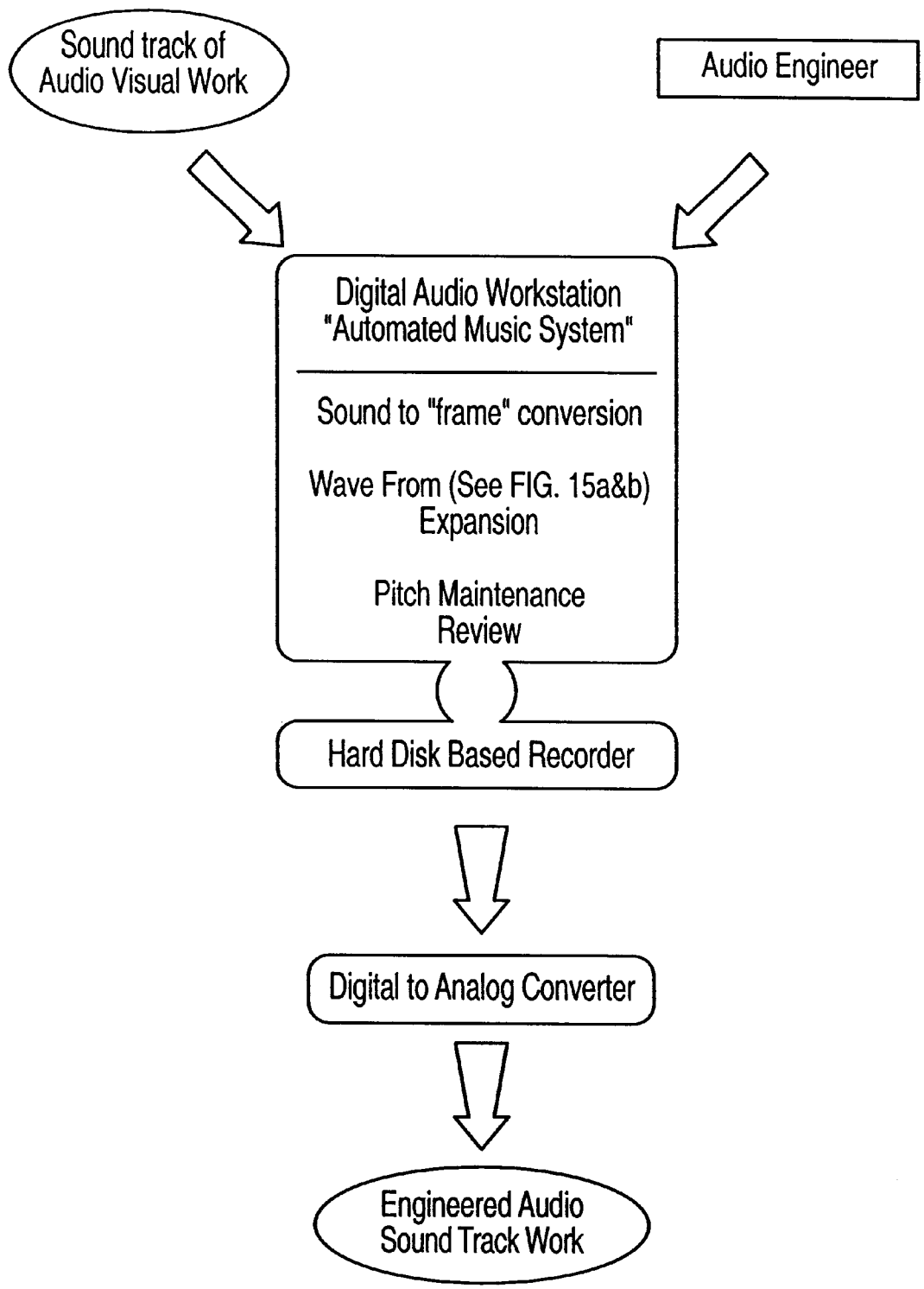
FIG. 14 is a flow chart of another system and method of carrying out euthetic captioning according to the present invention.
Figure 15A:
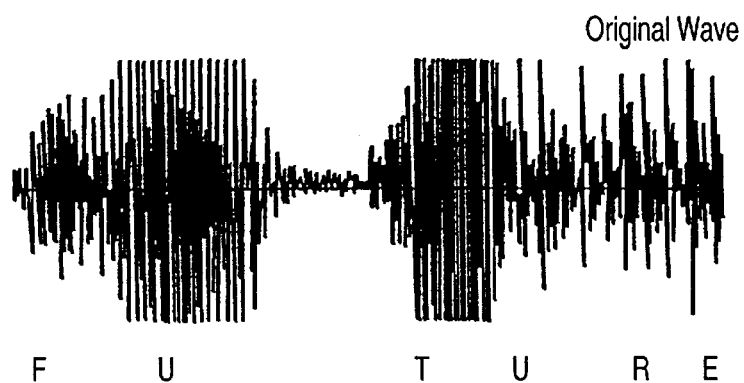
FIGS. 15a–b are representations of wave form expansion according one aspect of to the present invention.
Figure 15B:
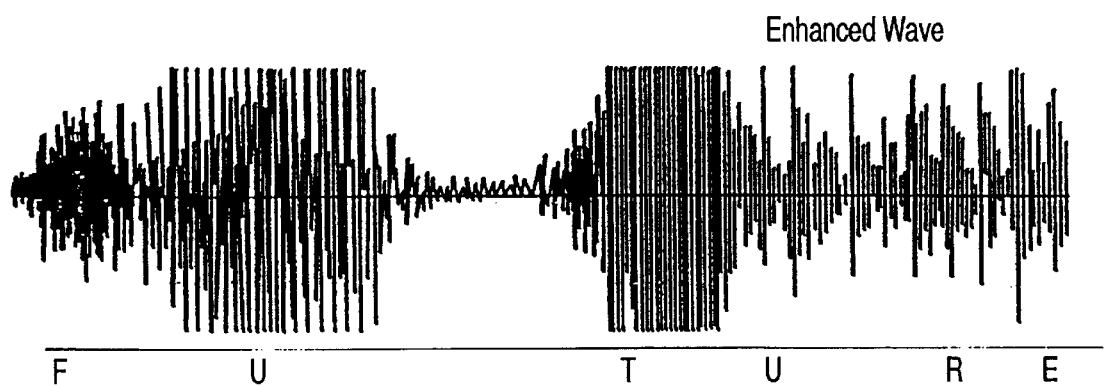

FIG. 14 depicts a system and method that slows down utterances without loss of pitch or tone and without apparent distortion. FIGS. 15a–b are depictions of a normal and expanded waveform, respectively, of the word "future" as expanded by the system and method depicted in FIG. 14. The waveform of FIG. 15b has the same pitch as the waveform of FIG. 15a because the amplitude of the waveform is kept constant while waveform is expanded.

Another embodiment of the invention is useful when the waveform is expanded by some fractional multiplier, as opposed to a whole number multiplier. For example, when it is desired to increase the length of a waveform by one-half (a 50% increase), as opposed to doubling the length (a 100% increase), known methods randomly select which portions of the waveform to expand. According to this aspect of the invention, the random selection of portions of the waveform is restricted to only vowel portions. This may be accomplished by means knows to those of skill in the art.

Figure 16:
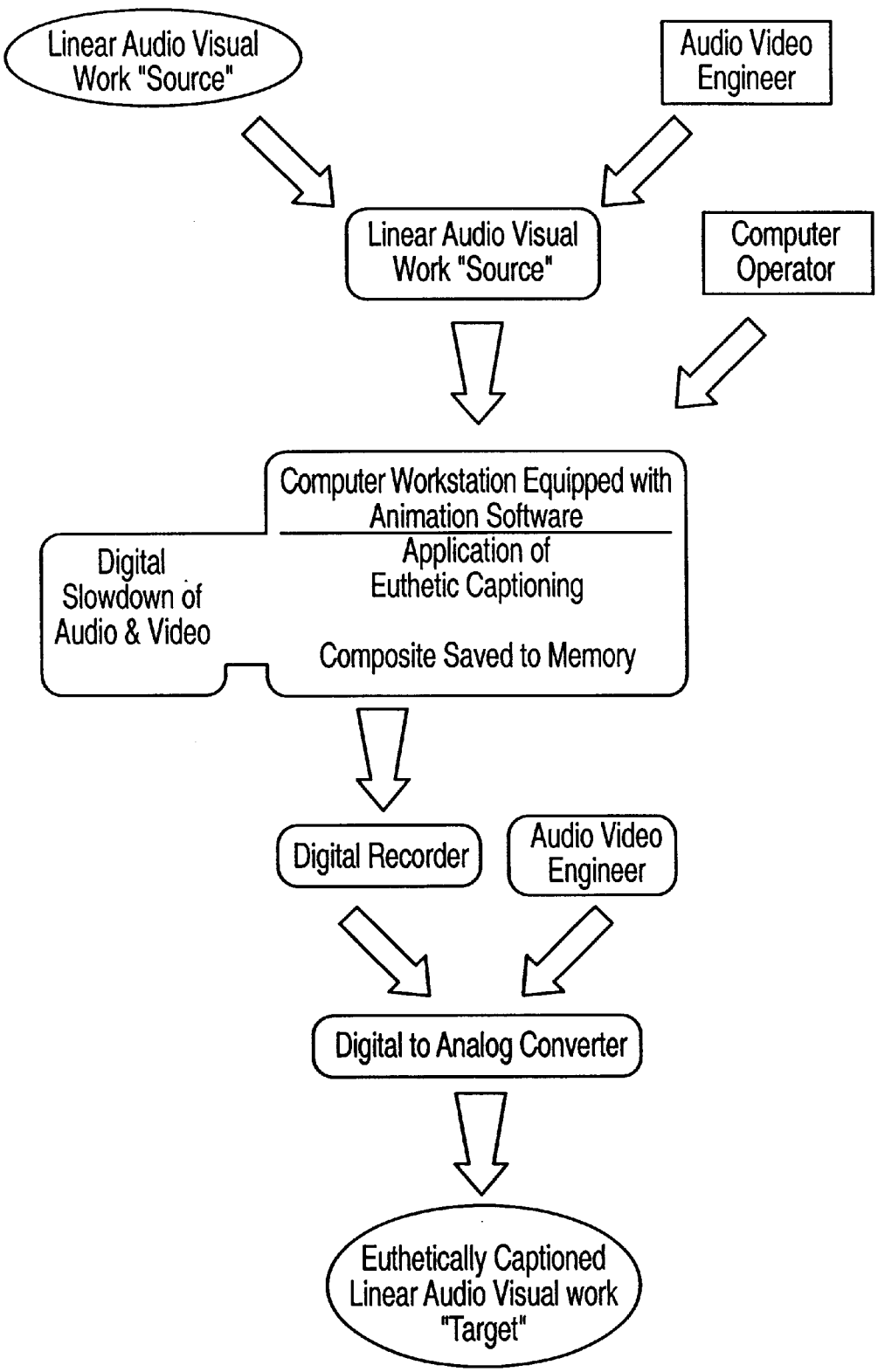
FIG. 16 is a flow chart of another system and method of carrying out euthetic captioning according to the present invention.

FIG. 16 depicts a digital system and method of applying euthetic captioning, utilizing known character animation software to position words.

Figure 17:
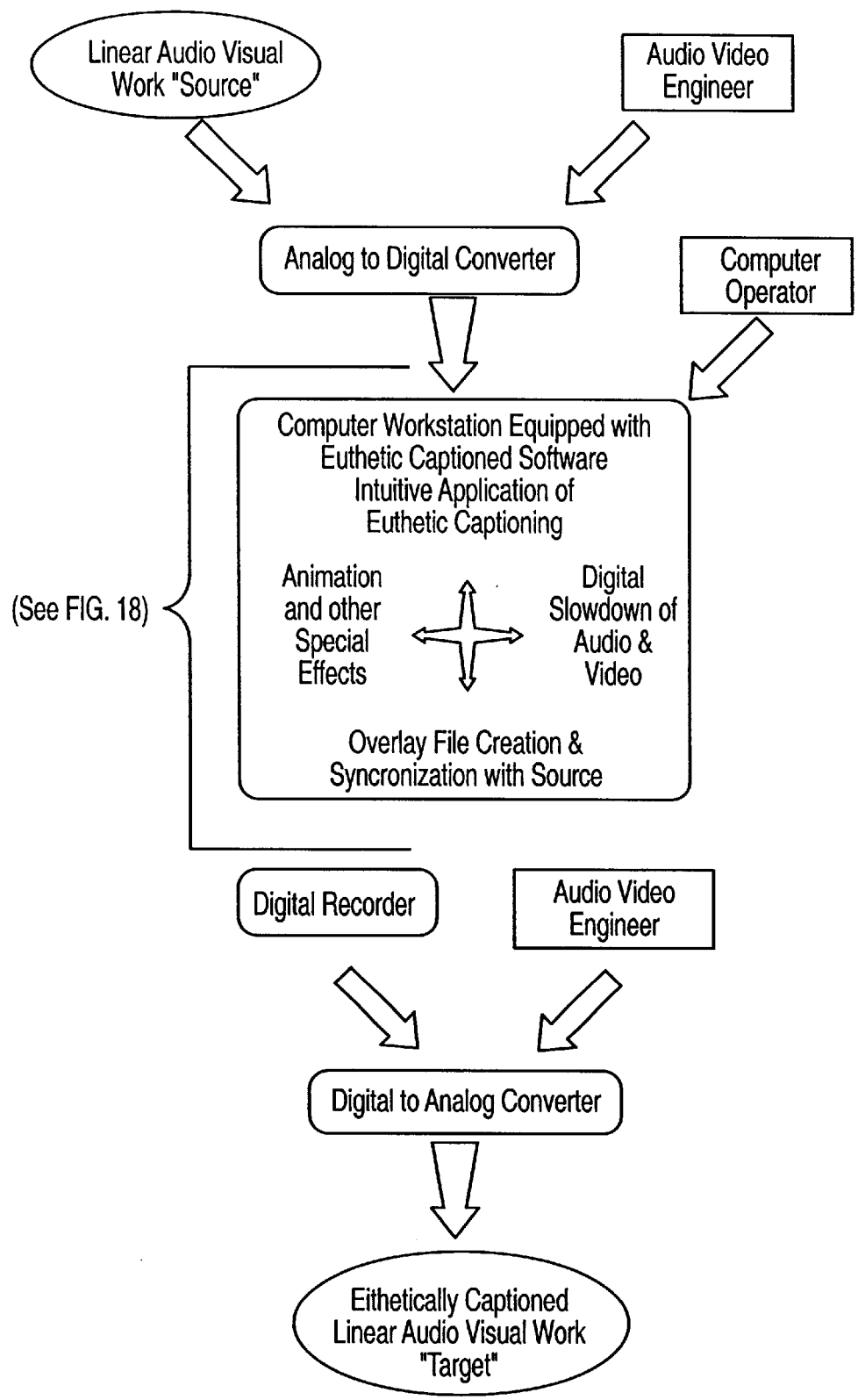
FIG. 17 is a flow chart of the system and method depicted in FIG. 16 showing further detail regarding the computer workstation.
Figure 18A:
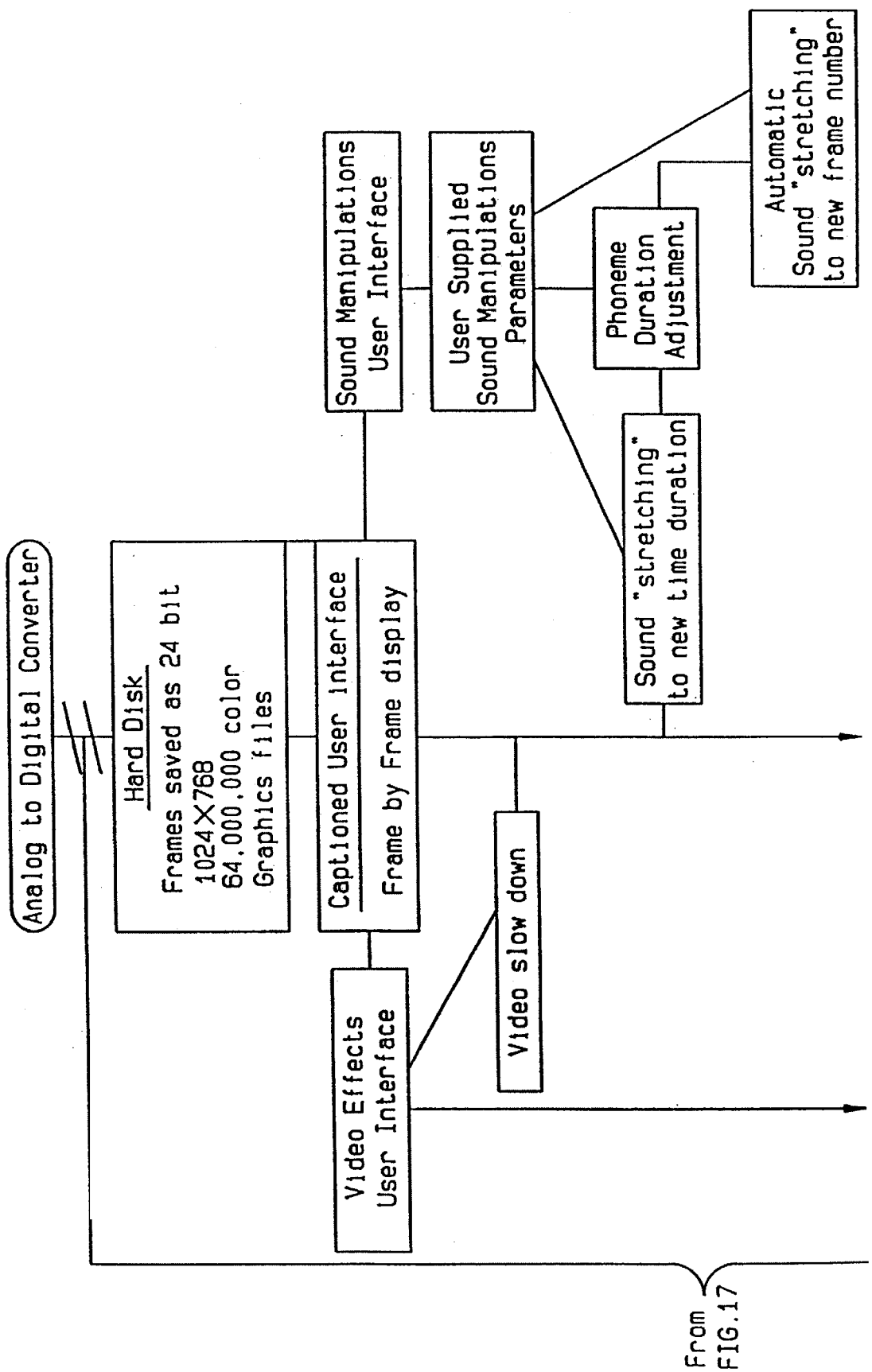
FIG. 18 is a flow chart showing further details regarding the computer workstation depicted in FIG. 17.
Figure 19A:
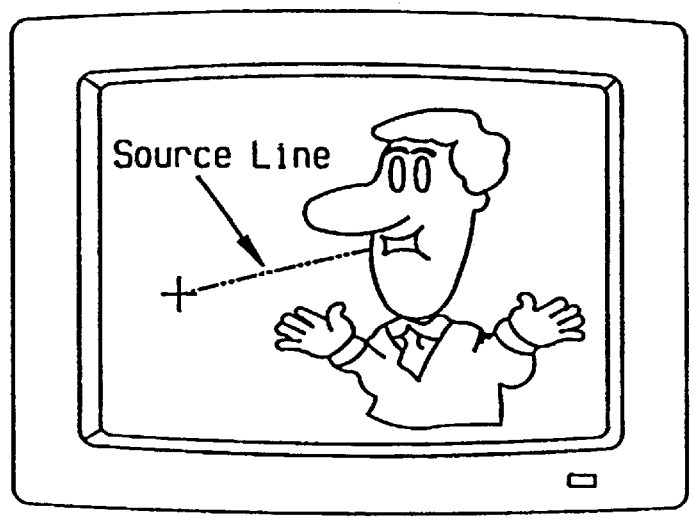
FIGS. 19a–d are representations of applying euthetic captioning.
Figure 19B:
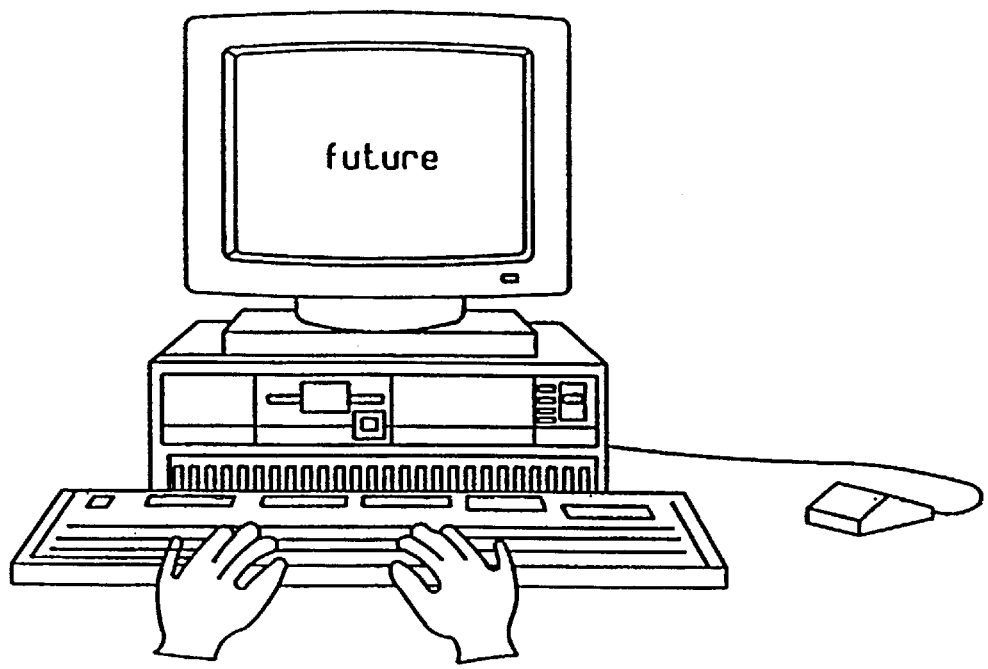
Figure 19C:
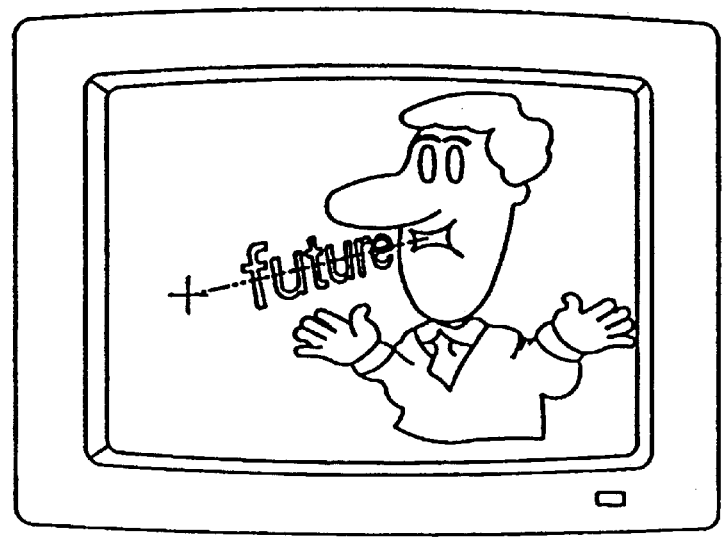
Figure 19D:
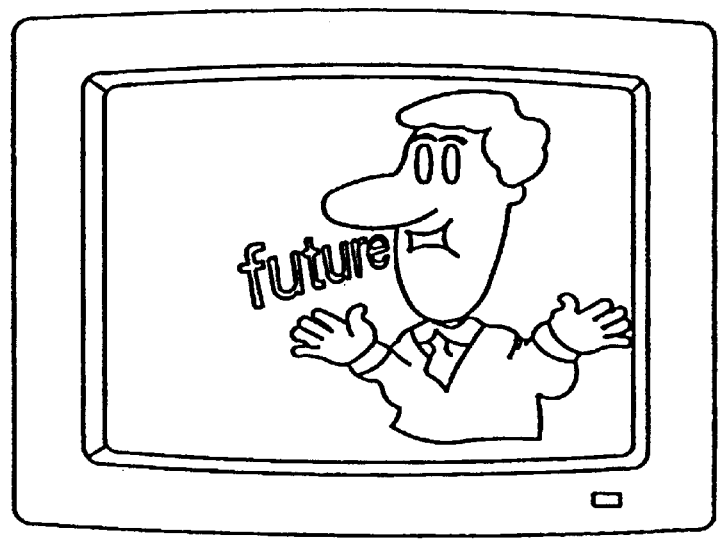

FIGS. 17–21 relate to another embodiment of the present invention, which is a system and method for intuitive euthetic captioning. FIG. 17 shows the system and method depicted in FIG. 16, utilizing euthetic captioning software according to this embodiment of the invention. FIG. 18 is a flow diagram showing further detail of the computer workstation used in the system and method depicted in FIGS. 16 and 17.

Figure 20A:
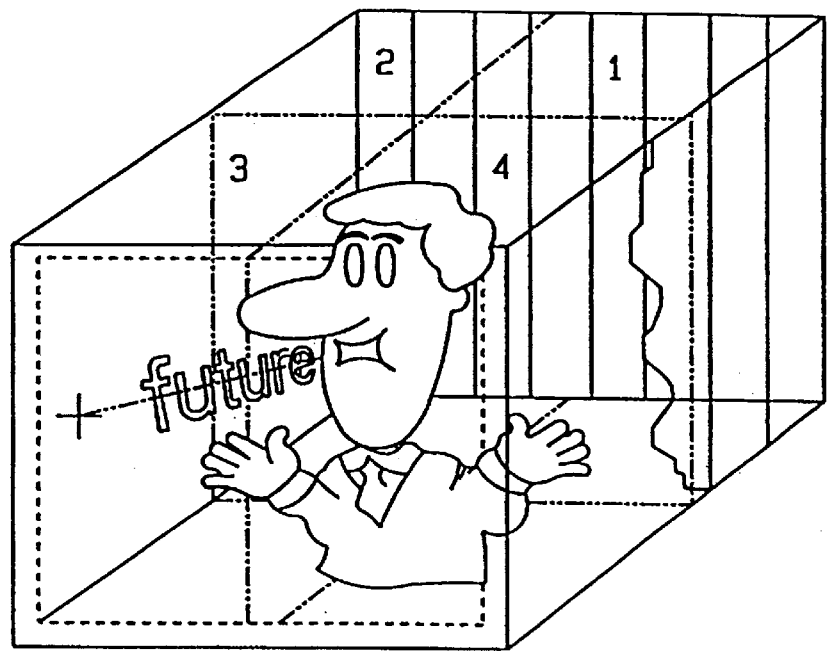
FIGS. 20a–b are representations of four-quadrant placement achieved with euthetic captioning according to the present invention.
Figure 20B:
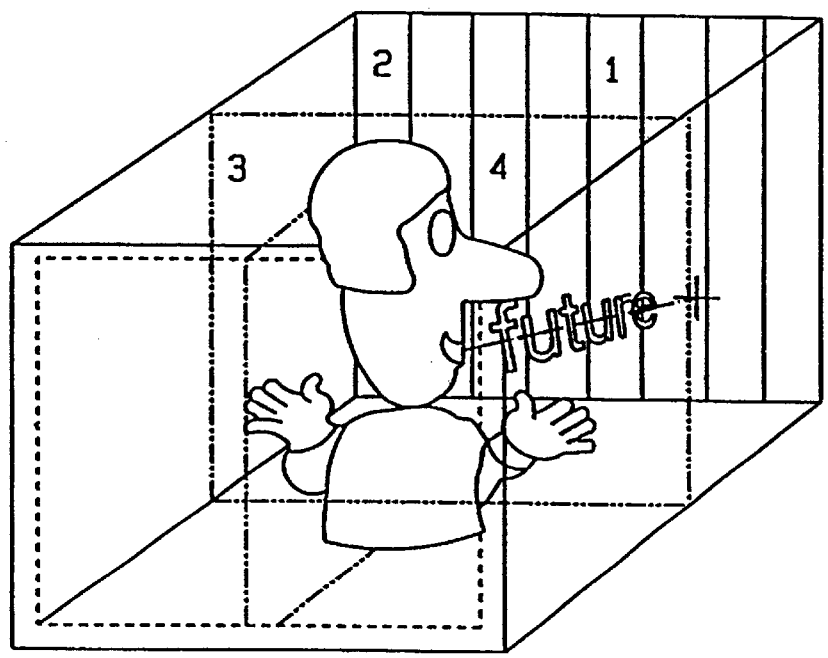
Figure 21A:
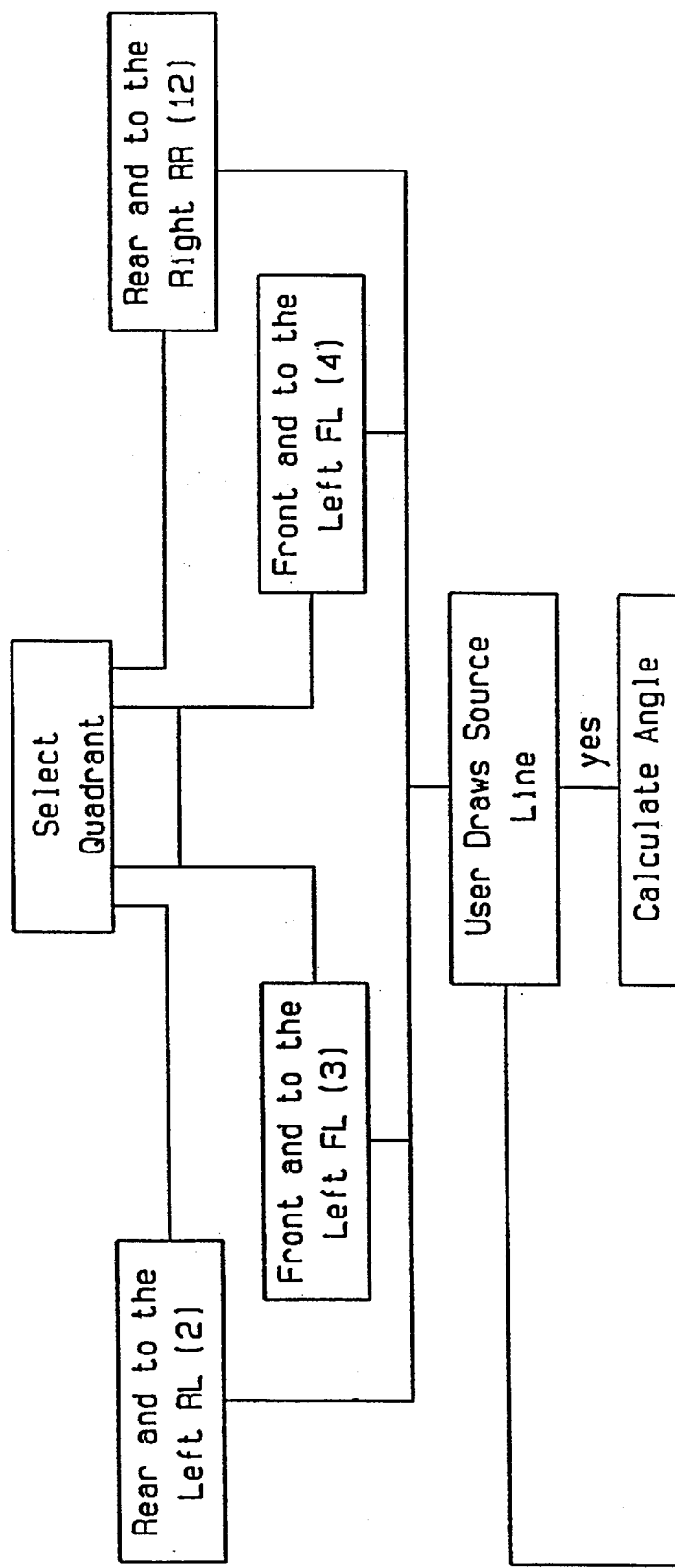
FIG. 21 is a flow chart depicting intuitive application of euthetic captioning according to the present invention.
Figure 21B:
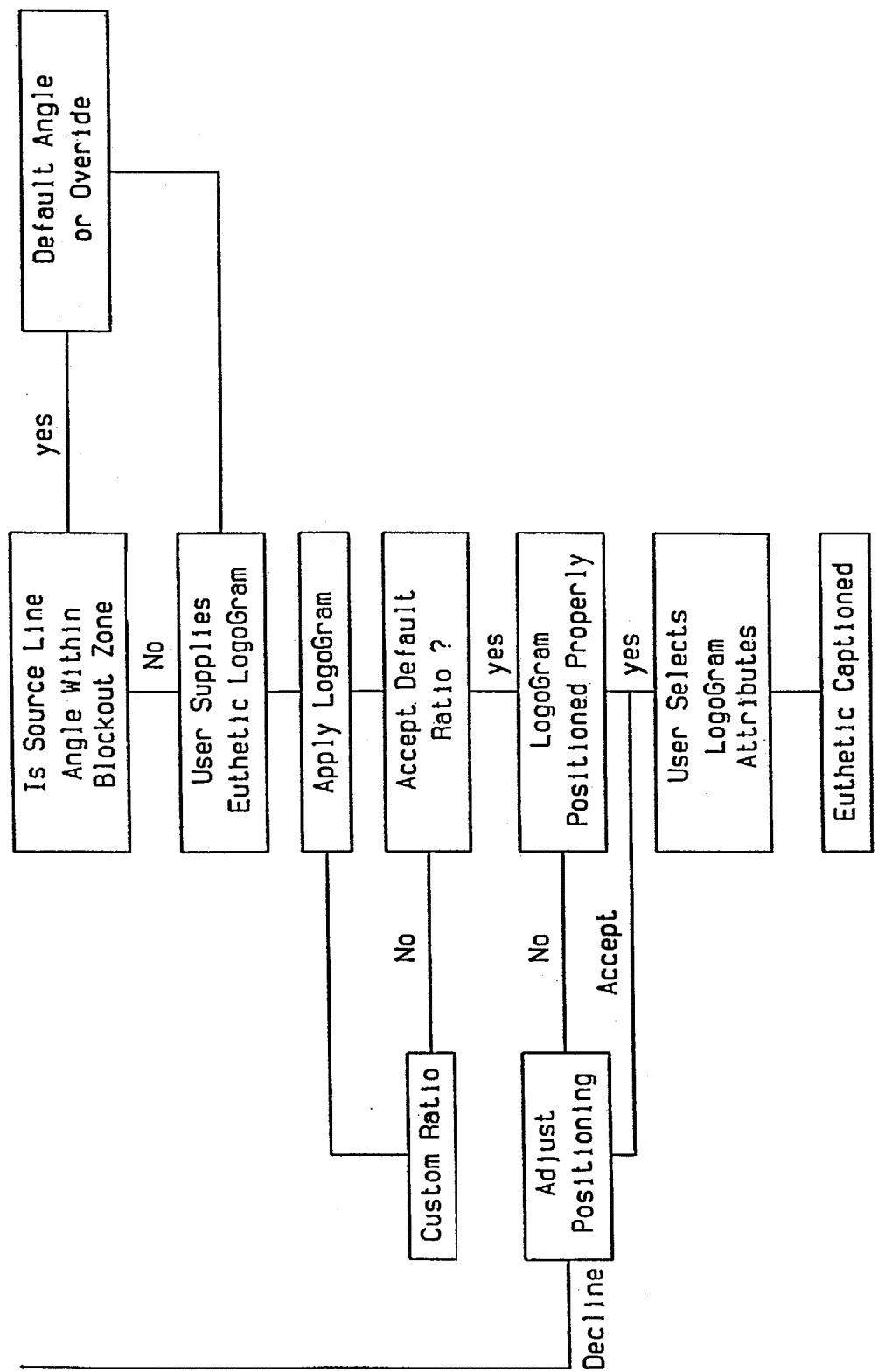

FIGS. 19a–d demonstrate details of applying euthetic captioning according to the present invention. FIGS. 20a–b depicts the four quadrants of a virtual three-dimensional world that a euthetically captioned word appears to inhabit. FIG. 21 is a flow diagram of a software module for placing a euthetically captioned word in an optimal orientation in any quadrant of the virtual three-dimensional world. The software preferably runs on a computer workstation system. While many input devices known to those of skill in the art may be utilized, preferably the user specifies a quadrant and draws a source line with a mouse, and enters with a keyboard. The computer system running the software module automatically positions the word on the source line, preferably so that the source line runs through the center of the main body of lower case letters (known to typographers as the "x-height"), such as the horizontal bar in the letter "e". Once the system and software have placed the word, the source line is deleted.

Figure 22:
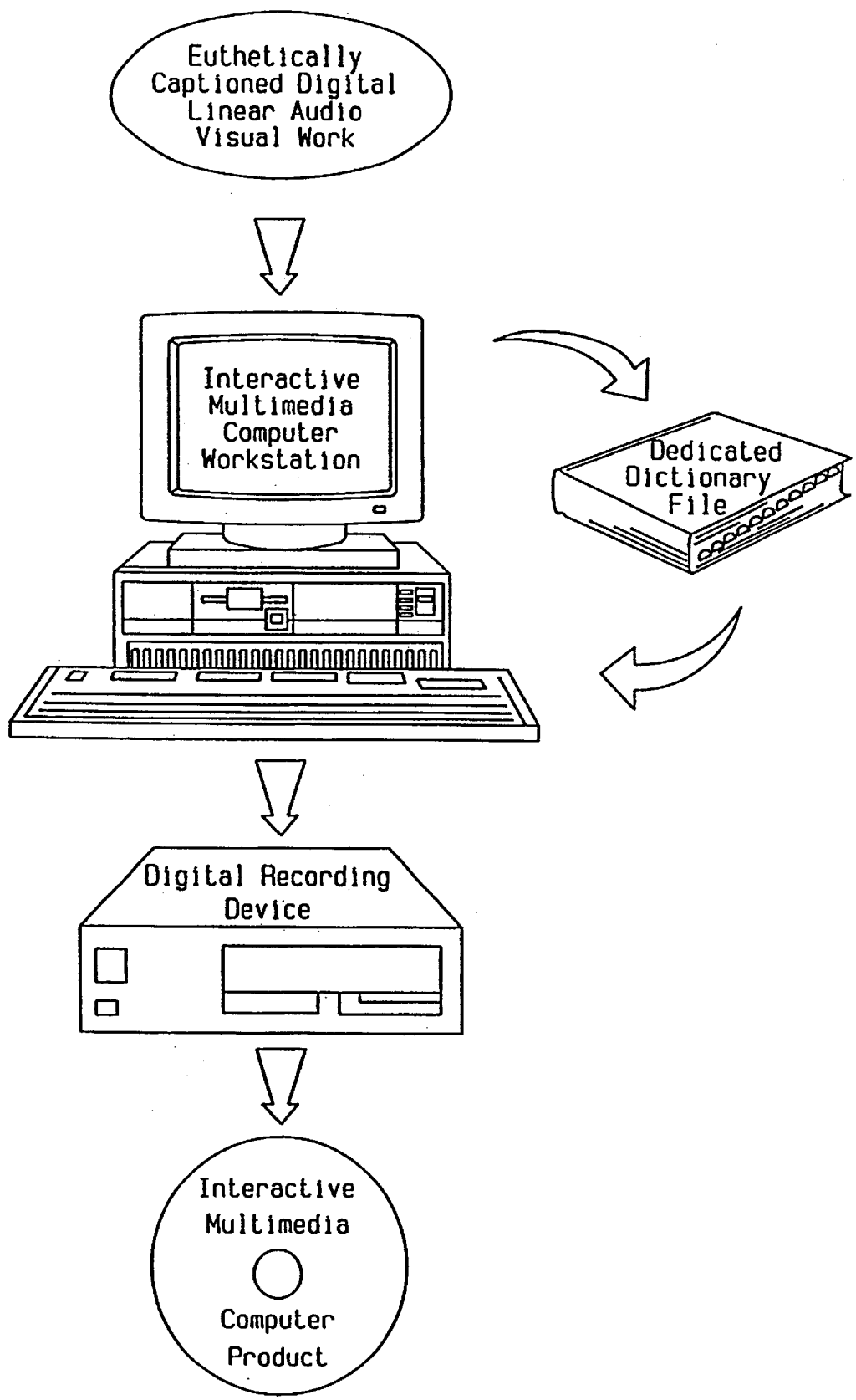
FIG. 22 is a schematic diagram of a multimedia platform according to the present invention.
Figure 23:
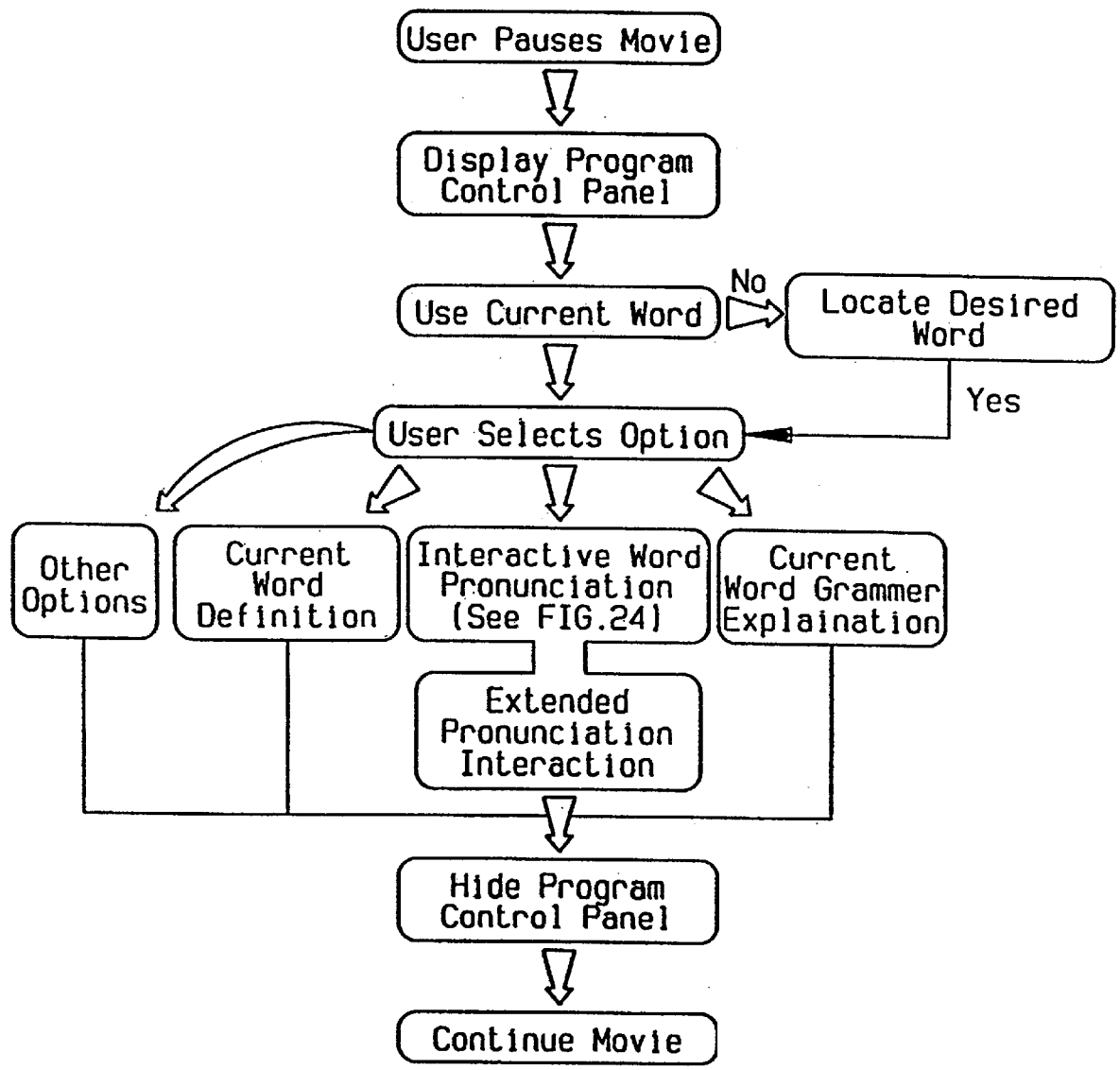
FIG. 23 is a flow chart of an interactive capability according to the present invention.

FIG. 22 is a schematic that depicts a multimedia platform incorporating an interactive multimedia computer workstation for creating interactive euthetically captioned works according to the present invention. FIG. 23 is a flow diagram of software to implement interactive capabilities.

Figure 24:
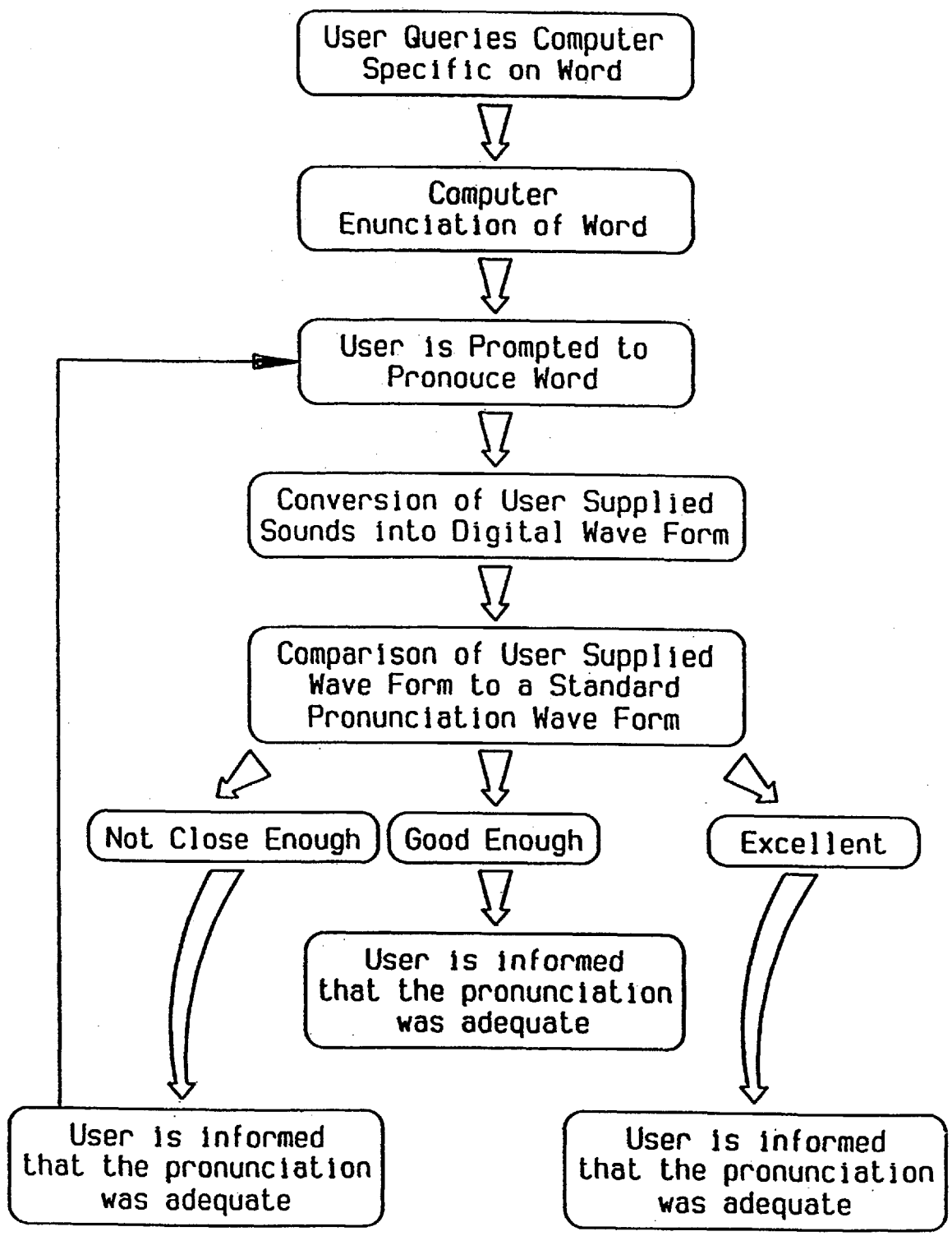
FIG. 24 is a flow chart of the interactive word pronunciation depicted in FIG. 23.

FIG. 24 is a flow diagram of interactive word pronunciation depicted in FIG. 23. According to this aspect of the invention, when a user stops a euthetically captioned audio-visual work on a particular word, the user may obtain a pronunciation lesson. Preferably, the user may speak into a microphone connected to a computer that contains voice wave analysis software, which compares the wave form created from the user's pronunciation of the word to a standard wave form for the correct pronunciation stored in a computer file. The computer then provides feedback to the user that either confirms correct pronunciation (for example, as "good enough" or "excellent") or prompts the user to try to pronounce the word again.

The other options depicted in FIG. 23 preferably will be presented as a menu of interactive applications that a user may select. For example, the user may select a writing application that will allow the user to mimic a word displayed by typing the word or by writing the word on an electronic tablet that produces output to handwriting recognition software. The interactive system preferably would provide feedback to inform the user whether or not the word had been properly typed or written.

Figure 25:
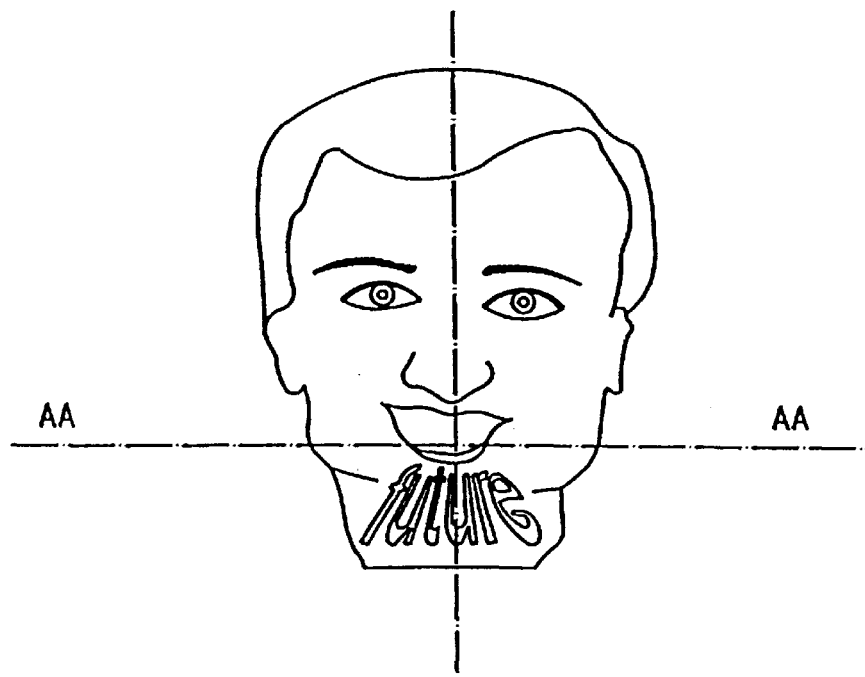
FIG. 25 is a schematic representation of a blockout zone according to the present invention.

FIG. 25 represents the placement of a word in the frontal "blockout zone" depicted in FIG. 9. A word may optionally be placed in this zone—on a plane passing through line AA of FIG. 25—as one way to make it appear that it is emanating from the speaker's mouth.

Figure 26:
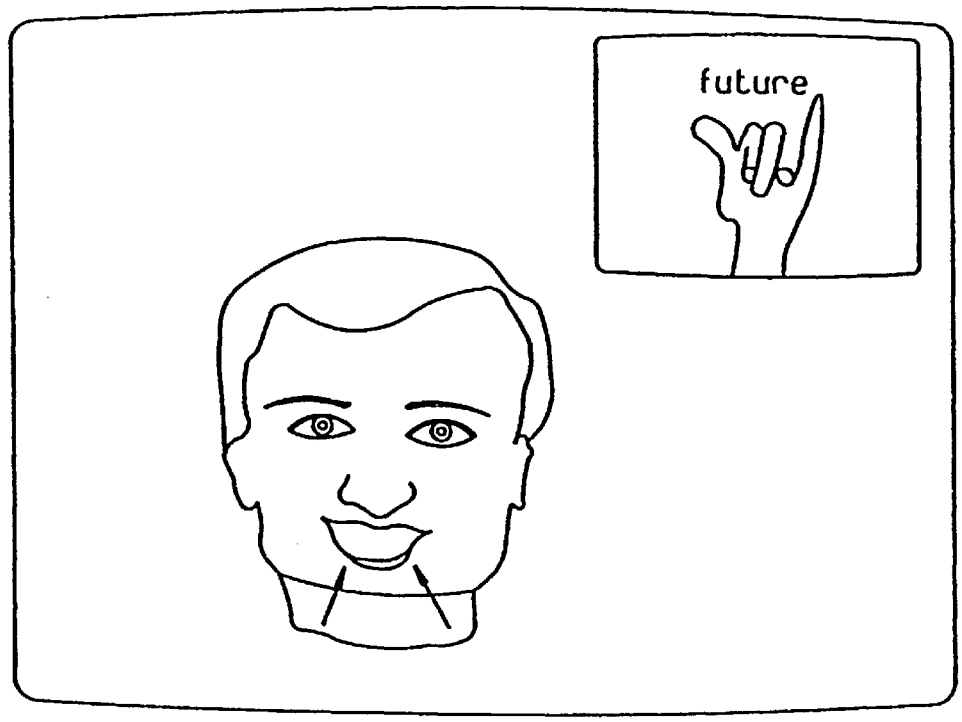
FIG. 26 is a schematic representation of one embodiment of the present invention using sign language.

One or more words may also be placed in association with the hand or hands of a person using sign language, such that there is a correspondence between such words and a single sign language element. An example of this embodiment of the present invention is depicted in FIG. 26, which shows a speaker on a TV screen and an inset box with a hand of a person doing simultaneous sign language translation. As the speaker says the word "Future" and the sign language interpreter signs that word, "Future" is placed in the inset box in association with the sign language element for that word.

What is claimed is:

1. A method of creating an audio-visual work comprising
   (1) providing in the work pictorial scenes with natural communication situations for presentation to a viewer-listener with at least one pictorial scene comprising frames capable of having their visual portion displayed and their audio portion heard;
   (2) creating a series of word utterances by at least one utterer with each utterer present in successive frames of such scene presentation;
   (3) further creating a series of visual word symbols, each such word symbol
       (i) corresponding to and associable with each word utterance;
       (ii) capable of teaching the viewer-listener the visual appearance of the uttered word;
       (iii) appearing in the sound source area of the frames which area includes the utterer;
       (iv) appearing briefly in such frames of the pictorial scenes at the same time the word utterances are heard so that each utterance and each such corresponding word symbol are associable at the same time by the viewer-listener; and
       (v) visually appearing in the frame alone so that when the viewer-listener hears an utterance he or she can see only the corresponding word symbol and no other word symbol;
   whereby the audio-visual created allows the viewer-listener to associate each such utterance with each such word symbol to learn the visual appearance of the uttered word and the sound of the word symbol.

2. The method of claim 1 in which such word symbol appears in a portion of the sound source area which is most likely to be viewed as the word is spoken.

3. The method of claim 1 in which the frames include action elements and in which such word symbol appears in a portion of the sound source area where the viewer-listener engages in meaningful focus on such action elements.

4. The method of claim 1 in which such word symbol appears in the sound source area portion where the listener-viewer's attention is directed by his or her interest in the audio-visual.

5. The method of claim 4 in which the sound source area portion is where there is action.

6. A method of creating a teaching audio-visual work comprising
   (1) providing in the work pictorial scenes with natural communication situations for presentation to a viewer-listener with at least one pictorial scene comprising frames capable of having their visual portion displayed and their audio portion heard;
   (2) creating a series of word utterances by at least one utterer in successive frames of such scene presentation;
   (3) fuirther creating a series of visual word symbols, one word symbol displayed in the sound source area portion from which the sound appears to emanate from and at least one other word displayed outside such portion, each such word symbol displayed in such portion
       (i) corresponding to and associable with each such word utterance;
       (ii) capable of teaching the viewer-listener the visual appearance of the uttered word;
       (iii) appearing in such portion so that the viewer-listener has an opportunity to be able to make such association; and
       (iv) appearing in such frames of the pictorial scenes at the same time the word utterances are heard so that each such utterance and each such corresponding word symbol are associable at the same time by the viewer-listener
   whereby the audio-visual created allows the viewer-listener to associate each such utterance with each such word symbol to learn the visual appearance of the uttered word and the sound of the word symbol.

7. The method of claim 6 in which such sound source area portion is the area which is most likely to be viewed as the word is spoken.

8. The method of claim 3 in which such sound source area portion is the area which is most likely to be viewed as the word is spoken.

9. The method of claim 4 in which such sound source area portion is the area which is most likely to be viewed as the word is spoken.

10. The method of claim 5 in which such sound source area portion is the area which is most likely to be viewed as the word is spoken.

11. A method of causing a population group comprising members to become aware of a group of written words of the language spoken in a territory comprising
    (a) causing a plurality of audio-visual works to be created each of which works is created by the practice of the method of claim 1; and
    (b) broadcasting and otherwise introducing such works into the territory to an extent and for a period of time whereby the population group becomes aware of such written words of the language.

12. A method of teaching a student comprising
    (a) creating one or more audio-visual works including natural communication situations, each of which works is created by the practice of method claim 1;
    (b) making such works available to the student; and
    (c) allowing such student to select arrangements for viewing and listening over time until each of the plurality of utterances has been heard by the student together with the viewing of their corresponding writings a sufficient number of times to assist in learning that certain utterances correspond to such certain writings.

* * * * *